United States Patent
Gopalakrishna et al.

(10) Patent No.: US 8,665,889 B2
(45) Date of Patent: Mar. 4, 2014

(54) UNIDIRECTIONAL ASYMMETRIC TRAFFIC PATTERN SYSTEMS AND METHODS IN SWITCH MATRICES

(75) Inventors: Satish Gopalakrishna, Alpharetta, GA (US); Monali Chakrabarty, Suwanee, GA (US); Bryan Freestone, Roswell, GA (US)

(73) Assignee: Ciena Corporation, Hanover, MD (US)

( * ) Notice: Subject to any disclaimer, the term of this patent is extended or adjusted under 35 U.S.C. 154(b) by 100 days.

(21) Appl. No.: 13/409,682

(22) Filed: Mar. 1, 2012

(65) Prior Publication Data
US 2013/0230052 A1    Sep. 5, 2013

(51) Int. Cl.
*H04L 12/46*    (2006.01)

(52) U.S. Cl.
USPC .......................... 370/401; 370/399; 370/390

(58) Field of Classification Search
USPC .......................... 370/401, 399, 390
See application file for complete search history.

(56) References Cited

U.S. PATENT DOCUMENTS

| | | | |
|---|---|---|---|
| 4,845,736 A | 7/1989 | Posner et al. | |
| 5,623,480 A | 4/1997 | Hartmann et al. | |
| 5,631,902 A | 5/1997 | Yoshifuji | |
| 5,812,528 A | 9/1998 | VanDervort | |
| 6,185,222 B1 * | 2/2001 | Hughes | 370/414 |
| 6,223,219 B1 | 4/2001 | Uniacke et al. | |
| 6,665,295 B1 | 12/2003 | Burns et al. | |
| 6,982,989 B2 | 1/2006 | Park et al. | |
| 7,016,379 B2 | 3/2006 | Falkenstein et al. | |
| 7,263,290 B2 | 8/2007 | Fortin et al. | |
| 7,330,425 B1 | 2/2008 | Gulati et al. | |
| 7,519,294 B2 | 4/2009 | Bullock | |
| 7,539,181 B2 | 5/2009 | Beshai | |
| 7,715,322 B2 | 5/2010 | Gopalakrishna et al. | |
| 2002/0093952 A1 | 7/2002 | Gonda | |
| 2003/0011846 A1 | 1/2003 | Gholamhosseini et al. | |
| 2003/0228146 A1 | 12/2003 | Fortin et al. | |
| 2005/0105538 A1 | 5/2005 | Perera et al. | |
| 2005/0195807 A1 | 9/2005 | Rao et al. | |
| 2007/0160068 A1 * | 7/2007 | Connolly et al. | 370/399 |
| 2007/0217405 A1 | 9/2007 | Beshai | |
| 2008/0080391 A1 * | 4/2008 | Hu et al. | 370/254 |
| 2010/0054731 A1 | 3/2010 | Oltman et al. | |

OTHER PUBLICATIONS

Yaakov (J) Stein, Chief Scientist—RAD Data Communications Slide Presentation; Introduction to G.805; 333.rad.com—Unique Access Solutions.

(Continued)

*Primary Examiner* — Dang T Ton
*Assistant Examiner* — Mewale Ambaye
(74) *Attorney, Agent, or Firm* — Clements Bernard PLLC; Christopher L. Bernard; Lawrence A. Baratta, Jr.

(57) ABSTRACT

A switch fabric system and network element based thereon include a N×M switch fabric with M Trail Termination Points (TTPs) each with N timeslots there through in a bidirectional manner, a first connection in the switch fabric, wherein the first connection includes a unidirectional asymmetric connection of X timeslots, wherein X<N, and a second connection in the switch fabric in an opposite direction as the first connection, wherein the second connection includes a unidirectional asymmetric connection of Y timeslots, wherein Y<N, and wherein at least one of the Y timeslots overlaps with one of the X timeslots on a same TTP of the M TTPs, wherein N, M, X, and Y each include an integer. A method includes establishing unidirectional asymmetric connections with overlapping portions therein as well as merging, splitting, and converting connections in-service and minimizing blocking probabilities.

20 Claims, 14 Drawing Sheets

(56) References Cited

OTHER PUBLICATIONS

ITU-T Telecommunication Standardization Sector of ITU—M.3100; Series M: Telecommunication Management, Including TMN and Network Maintenance; Generic Network Information Model—ITU-T Recommendation M.3100; Apr. 2005.

Nigel Davis (MTNM); John Strassner (SID); SID and MTNM Models in Harmony—TeleManagement Forum—May 15, 2005.

H. Kam Lam; Lucent Technologies—Management of ASON-capable Network and its Control Plane; International Telecommunication Union—ITU-T Workshop "NGN and its Transport Networks" Kobe, Apr. 20-21, 2006.

ITU—International Telecommunication Union; Series G: Transmission Systems and Media, Digital Systems and Networks—Digital Networks—General Aspects; Generic functional architecture of transport networks—G.805 Mar. 2000.

* cited by examiner

UNIDIRECTIONAL ASYMMETRIC TRAFFIC PATTERN SYSTEMS AND METHODS IN SWITCH MATRICES

FIELD OF THE INVENTION

Generally, the field of art of the present disclosure pertains to communication networks, and more particularly, to unidirectional asymmetric traffic pattern systems and methods in switch matrices, network elements, and networks based thereon.

BACKGROUND OF THE INVENTION

Conventionally, in communication networks, switches can be managed through abstract models. For example, cross connects in a switching fabric can be managed based on abstractions in software consistent with standards defined by the International Telecommunications Union (ITU) and Telecordia standards bodies. One such standard is ITU-T M.3100 "Generic network information model" (April 2005), the contents of which are incorporated by reference herein. In operation, the abstractions are used to manage physical connections in an actual switch. That is, the abstractions represent logical software objects managing real connections in hardware. Conventional abstraction systems and methods almost always utilize bidirectional circuits. While there are instances of a unidirectional connection made up of unidirectional Connection Termination Points (CTPs), these are always symmetric in nature, which means that if a timeslot in a Connection Termination Point (CTP) is participating in a concatenation group of a size m, in a transmit direction, then it cannot participate in another concatenation group of size n, different from m, which may belong to another connection. CTPs are logical connection points used for cross-connecting and automated provisioning of end-to-end circuits. For example, CTPs can include one or more STS-1 (Synchronous Transport Signal 1), VC-3 (Virtual Circuit 3), etc. time slots.

Another restriction is that even if the concatenation size is same, the head timeslot must be the same for every timeslot participating in that concatenation group, in both transmit and receive direction. This restriction applies to various simple connections (e.g., one-way, two-way, two-way protected and unprotected connections, etc.) as well as any flexible complex connections (FCCs). Hence conventional abstraction systems and methods are all symmetric traffic patterns. Both transmit and receive direction of every timeslot that belongs to any CTP can only be used with a same concatenation and remains with a same CTP in both directions. Thus, every timeslot in any CTP is coupled together in both transmit and receive directions. Disadvantageously, if only one direction is used, the other direction automatically becomes unusable. Conventional abstraction systems and methods have bandwidth fragmentation and/or loss of bandwidth whenever there is a need to have instances of asymmetric traffic patterns. Because a true asymmetric pattern is not possible to have as described herein, the conventional abstraction systems and methods leave out the bandwidth in an opposite direction as unusable and configure/provision the next set of timeslots for different concatenation. For example, assume provisioning of two unidirectional circuits having STS-3c (Synchronous Transport Signal) concatenation in a transmit direction and STS-12c (Synchronous Transport Signal 12c) in a receive direction on an OC-48 (Optical Carrier 48) line, then the first STS-3c can be used in the transmit direction on timeslots 1-3 and the next set of twelve timeslots (4-15) are used in the receive direction. The timeslots 1-3 are unused in the receive direction while the timeslots 4-15 are unused in the transmit direction causing bandwidth fragmentation and loss.

Further, assume two different connections in a switch, e.g. symmetric or asymmetric with drops and continues, and assume these two different connections belong to different end users, it is not possible conventionally to merge these connections into one manageable connection without hitting traffic and without affecting blocking probability of a switch fabric. That is, either traffic will be hit or blocking probability will increase because of increased usage of channels between ingress to center or from center to egress than the minimum needed. Specifically, this merger involves merging the abstractions and operating on the underlying physical connections based thereon. When the abstractions are merged, the physical connections do not go over the same single center stage, but rather over multiple center stages therefore requiring many more channels which are wasted in the links between ingress and center as well as center to egress switches. Thus, conventional abstraction systems and methods do not allow one traffic pattern to be converted to another without deleting and re-creating, e.g. conversion from symmetric to asymmetric and vice-versa. Conventional abstraction systems and methods do not provide a way for merging and splitting traffic patterns between two different end users within a single network element without affecting traffic and also without affecting the blocking probability. They may re-work the connections but do not guarantee that the connections pass through the same exact center stage for every flow from begin to end and thus causing an increased blocking probability.

BRIEF SUMMARY OF THE INVENTION

In an exemplary embodiment, a switch fabric system includes a N×M switch fabric with M Trail Termination Points (TTPs) each with N timeslots there through in a bidirectional manner, a first connection in the switch fabric, wherein the first connection includes a unidirectional asymmetric connection of X timeslots, wherein X<N, and a second connection in the switch fabric in an opposite direction as the first connection, wherein the second connection includes a unidirectional asymmetric connection of Y timeslots, wherein Y<N, and wherein at least one of the Y timeslots overlaps with one of the X timeslots on a same TTP of the M TTPs, wherein N, M, X, and Y each includes an integer. The switch fabric system can further include a third connection in the switch fabric, wherein the third connection comprises a bidirectional symmetric connection of Z timeslots, wherein Z<N, wherein none of the Z timeslots overlap with the X timeslots or the Y timeslots on any of the TTPs, wherein Z includes an integer. The switch fabric system can further include a management plane associated with and for management of the switch fabric, wherein the management plane includes a plurality of Connection Termination Point objects, and wherein each Connection Termination Point object comprises one of a source being sent to the switch fabric and a sink being received from the switch fabric. For a unidirectional asymmetric connection, the source and the sink of a Connection Termination Point object can be directionally decoupled such that the source and the sink participate in two separate connections of different sizes. For the unidirectional asymmetric connection, from a perspective of the management plane, the source and the sink of the Connection Termination Point object can be represented as separate source and sink CTP objects with different bandwidth amounts.

In the management plane, the first connection can be managed by a first Connection Termination Point object and a second Connection Termination Point object with the source of the first Connection Termination Point object connected to the sink of the second Connection Termination Point object, and wherein, in the management plane, the second connection can be managed by a third Connection Termination Point object and a fourth Connection Termination Point object with the source of the third Connection Termination Point object connected to the fourth of the second Connection Termination Point object. The first Connection Termination Point object and the third Connection Termination Point object can be associated with a first Trail Termination Point, and wherein the second Connection Termination Point object and the fourth Connection Termination Point object can be associated with a second Trail Termination Point. The first Connection Termination Point object and the third Connection Termination Point object each can include different head timeslots on the first Trail Termination Point. The first Connection Termination Point object and the third Connection Termination Point object can be associated with a first Trail Termination Point, wherein the second Connection Termination Point object can be associated with a second Trail Termination Point, and wherein the fourth Connection Termination Point object can be associated with a third Trail Termination Point.

Each of the first Connection Termination Point object, the second Connection Termination Point object, the third Connection Termination Point object, and the fourth Connection Termination Point object can be associated with separate Trail Termination Points. Each of the separate Trail Termination Points can include a bidirectional connection supporting unidirectional asymmetric connections through the Connection Termination Point objects. The management plane can further include a Virtual Connection Point between the first Connection Termination Point object and the second Connection Termination Point object, wherein the Virtual Connection Point includes both a point of input selection and a broadcasting point. The Virtual Connection Point can be utilized to merge the first connection with another connection through connecting an output of the Virtual Connection Point to the another connection. The first connection and the second connection each can include different concatenations. The switch fabric can be configured to convert the third connection from the bidirectional symmetric connection of Z timeslots to a unidirectional asymmetric connection in-service.

In another exemplary embodiment, a method includes defining a first connection through a switch fabric in a first direction, wherein the first connection includes a unidirectional asymmetric connection with a first set of parameters, establishing the first connection through the switch fabric with the first set of parameters defining a second connection through the switch fabric is a second direction opposite from the first direction, wherein the second connection includes a unidirectional asymmetric connection with a second set of parameters, and wherein the second connection overlaps at least part of the first connection, and establishing the second connection through the switch fabric with the second set of parameters. The method can further include operating a third connection through the switch fabric bidirectionally, converting the third connection to a unidirectional connection by decoupling end points of the third connection from one another thereby converting the third connection into a fourth connection in the first direction and a fifth connection in the second direction, and adjusting parameters of the fourth connection to thereby convert the fourth connection to a unidirectional asymmetric connection.

In yet another exemplary embodiment, a network element includes a plurality of ports, a N×M switch fabric comprising M Trail Termination Points (TTPs) each including N timeslots there through in a bidirectional manner, wherein the switch fabric is connected to the plurality of ports; a first connection in the switch fabric and terminating on one of the plurality of ports, wherein the first connection includes a unidirectional asymmetric connection of X timeslots, wherein X<N, and a second connection in the switch fabric in an opposite direction as the first connection and terminating on one of the plurality of ports, wherein the second connection comprises a unidirectional asymmetric connection of Y timeslots, wherein Y<N, and wherein at least one of the Y timeslots overlaps with one of the X timeslots on a same TTP of the M TTPs, wherein N, M, X, and Y each are an integer. The network element can further include a controller configured to operate a control plane for establishment of connections through the network element, wherein the control plane is configured to concurrently manage bidirectional symmetric connections, unidirectional symmetric connections, and unidirectional asymmetric connections. The control plane can treat the first connection and the second connection as occupied bidirectional connections for new bidirectional connections and unoccupied unidirectional connections based on the X timeslots and the Y timeslots for new unidirectional connections.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which:

FIG. 4 is a block diagram of a switch fabric with exemplary asymmetric, directionally decoupled connections there through;

DETAILED DESCRIPTION OF THE INVENTION

In various exemplary embodiments, the present disclosure relates to unidirectional asymmetric traffic pattern systems and methods in switch matrices, network elements, and networks based thereon. In particular, the systems and methods include switch fabrics, network elements, methods, and networks based thereon using an information model such as ITU-T M.3100 or variants thereof to manage physical connections therein. To address limitations associated with symmetric traffic patterns between transmit and receive directions, the systems and methods include asymmetric traffic patterns in the switch matrices, network elements, and networks based thereon. In particular, the systems and methods include a flexible way for overlapping two different size cross connects and/or FCCs in transmit and receive directions seamlessly. To address limitations associated with merging and splitting traffic patterns, the systems and methods utilize Virtual Connection Point (VCP) merges and splits. For example, VCPs can be part of one or more cross connects and they can be merged and split at will. When VCPs are merged, they ensure use of a single center stage switch. To address limitations associated with traffic conversions between symmetric and asymmetric and vice versa, the systems and methods support in-server conversions without affecting traffic. Also, the systems and methods include an asymmetric bandwidth manager with collocated and correlated bandwidth support. In particular, the asymmetric bandwidth manager can be used with control planes, data planes, etc. to collocate bandwidth and manage bandwidth in different directions.

Figure 1:
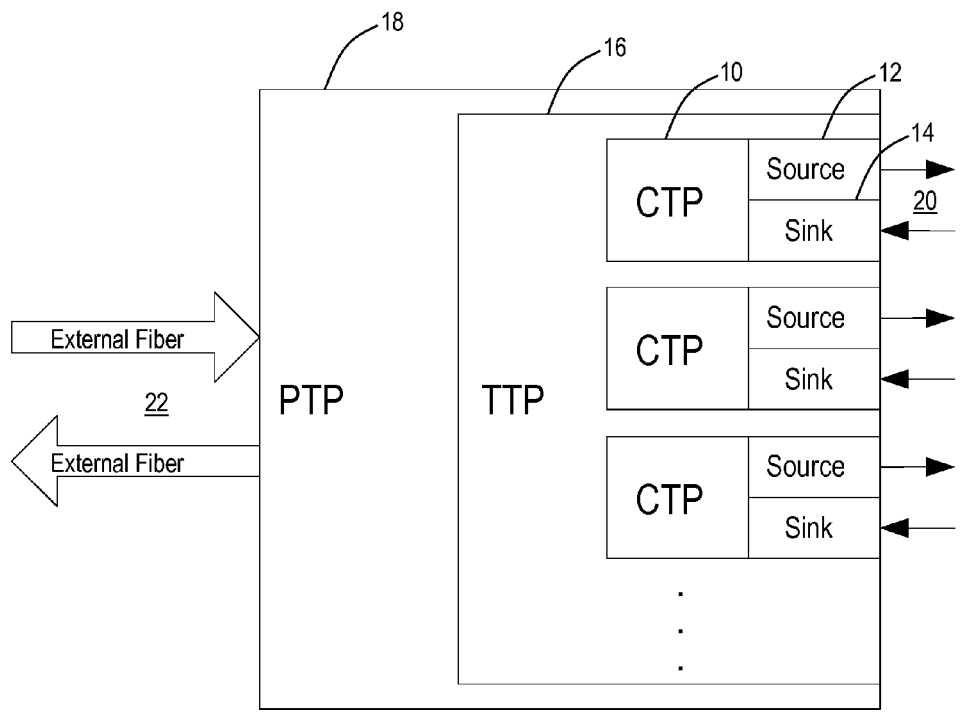
FIG. 1 is a block diagram of a logical Connection Termination Point (CTP) object model of source and sink components.

Referring to FIG. 1, in an exemplary embodiment, a logical CTP object model 10 illustrates source and sink components 12, 14. Note, the logical CTP object model 10 is a software object that abstracts physical resources in a switch matrix for management thereof. That is, the logical CTP object model 10 represents physical connections for management thereof. For context, multiple logical CTP object models 10 can be part of a Trail Termination Point (TTP) 16 which is part of a Physical Termination Point (PTP) 18. The logical CTP object model 10 includes directional elements 20 that can either be Source, Sink or Both. These directional elements 20 can connection to other directional elements 20 of other logical CTP object models 10 to denote physical connections in the switch matrix. With the unidirectional asymmetric traffic pattern systems and methods, the directionality not only applies to the usage but also to "bandwidth allocation". For example, if a source 12 is used in one direction, this implies that the other direction bandwidth (i.e., the accompanying sink 14) is available for use in any cross connect. The TTP 16 is an object that represents Trail termination endpoints of transport connections. The PTP 18 is an object that represents a physical port. Note, the PTP 18 is illustrated interfacing external fibers 22 for ingress and egress.

Conceptually, FIG. 1 illustrates the objects 10, 12, 14, 16, 18 for ingress/egress into a network element. That is, the fibers 22 can represent actual physical ports on the network element, and the objects 10, 12, 14, 16, 18 are management objects used by the network element for management of connections in actual hardware in the network element. The source 12 for each module 10 can connect to another sink 14 of another model 10 thereby denoting a cross connect in the network element. Conversely, the sink 14 for each module 10 can connect to another source 14 of another model 10 thereby denoting a cross connect in the network. The logical CTP object model 10 can include various information associated therewith such as parent TTP 16, head timeslot, concatenation size, a timeslot map on SONET/SDH and OTN, and the like. Conventionally, the logical CTP object model 10 can be part of a bidirectional cross-connect in which case both the sink 12 and the source 14 are part of the same cross-connect. In addition to the bidirectional cross-connect, the asymmetric traffic pattern systems and methods enable the logical CTP object model 10 to be part of two separate cross connects in which the sink 12 and the source 14 are going to different connections. As discussed herein, these can be referred to as Direction Decoupled Endpoints (DDE), DDE Flexible Cross Connect (DDE FCC), and DDE Cross Connect (DDE XCON). Further, the asymmetric traffic pattern systems and methods support asymmetric connections whereby the sink 12 has a different size from the source 14 while going to different connections.

Figure 2:
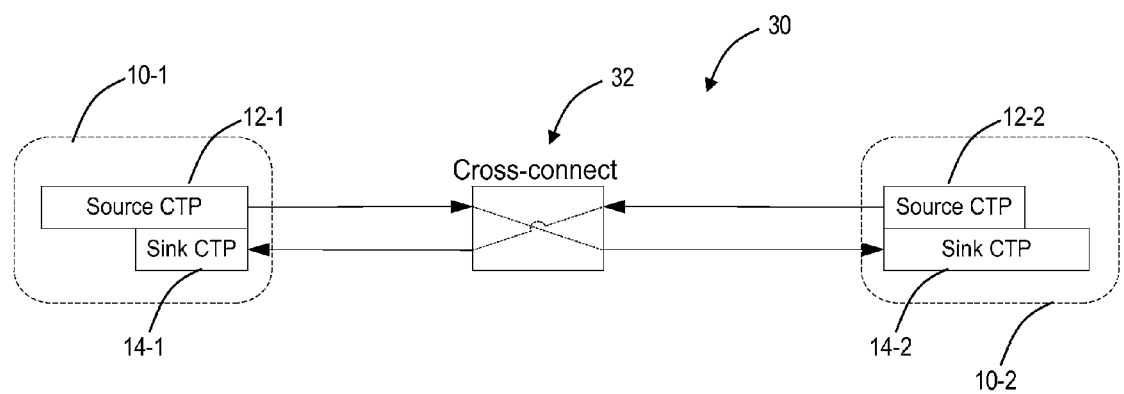
FIG. 2 is a block diagram of two logical CTP object models interconnected therebetween for a cross connect model.

Referring to FIG. 2, in an exemplary embodiment, a block diagram illustrates two logical CTP object models 10-1, 10-1 interconnected there between for a cross connect model 30. As described herein, the cross connect model 30 provides management objects to manage physical connections in a switch matrix. That is, the cross connect model 30 models the data flow through the switch matrix the CTP object model 10-1 through a cross-connect object 32 then to the CTP object model 10-2. Also as described herein, the source 12-1, 12-2 and the sink 14-1, 14-2 endpoints of the CTP object models 10-1, 10-2 are connected together when used in configuring a cross-connect. Once a CTP is associated with a cross-connect object, it cannot be used with another cross-connect object. The CTP object models 10-1, 10-2 (and other CTP object models 10 described herein) are unidirectional asymmetric CTPs. At a given head-Timeslot on a TTP, two different concatenation sizes or different timeslot maps of same size can be used in source and sink (Rx and Tx) directions resulting in creation of two "Unidirectional Asymmetric CTPs". This de-couples the timeslot usage/allocation on the TTP. Each Asymmetric CTP is used in a single direction. From a CTP Modeling point of view, both unidirectional and bidirectional views of CTPs are available to the user. Depending on the application, the user can pick and choose the type of CTP. For Asymmetric traffic pattern, unidirectional CTPs are used essentially.

Figure 3:
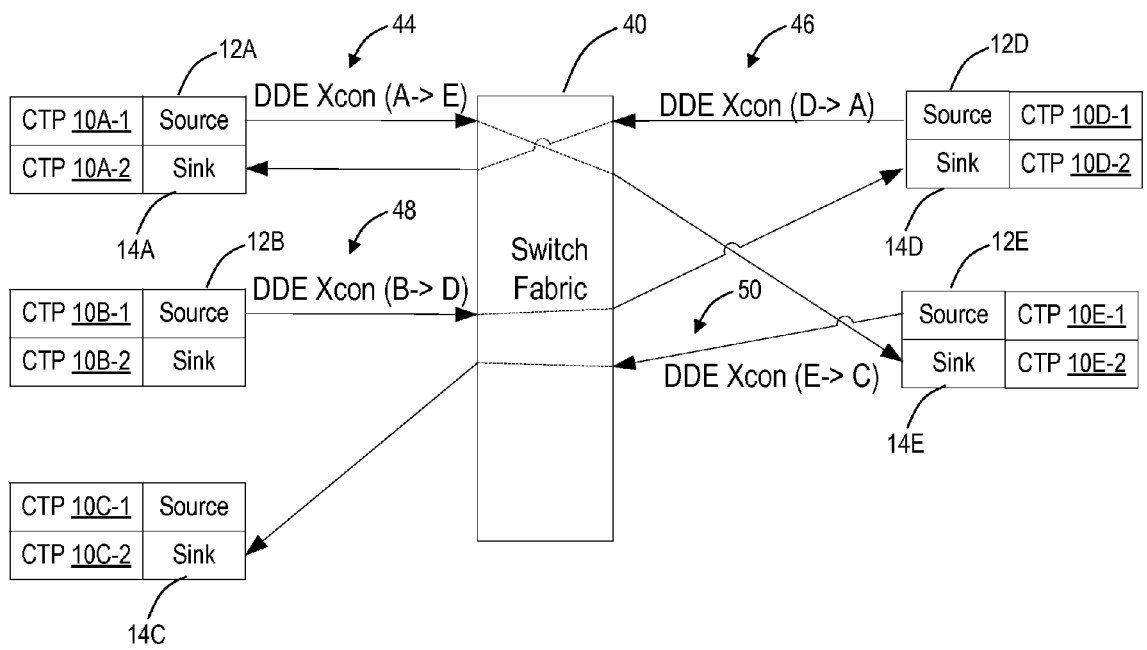
FIG. 3 is a block diagram of a Direction Decoupled Endpoint Cross Connect (DDE XCON) of various CTP object models with decoupled sources and sinks therebetween through a switch fabric.

Referring to FIG. 3, in an exemplary embodiment, a block diagram illustrates a switch fabric 40 with DDE XCONs there through. The switch fabric 40 includes various CTP object models 10A-1, 10A-2, 10B-1, 10B-2, 10C-1, 10C-2, 10D-1, 10D-2, 10E-1, 10E-2 with decoupled sources 12 and sinks 14 there between through the switch fabric 40. By way of definition, a "source" such as the source 12 denotes a direction towards the switch fabric 40, and a "sink" such as the sink 14 denotes a direction from the switch fabric 40. The switch fabric 40 is a physical device that provides is a combination of hardware, software, firmware, etc. that moves data between ports which are managed by the CTP object models 10A-1, 10A-2, 10B-1, 10B-2, 10C-1, 10C-2, 10D-1, 10D-2, 10E-1, 10E-2. For example, the switch fabric 40 can be configured to switch channels, timeslots, tributary units, etc. between the ports. Further, the granularity of the switch fabric can include SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3

(VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), etc.; Ethernet granularity; Digital Signal n (DSn) granularity such as DS0, DS1, DS3, etc.; and the like. The switch fabric 40 can be any physical configuration. For example, in an exemplary embodiment, the switch fabric 40 can include a three stage Clos switch. The object models 10 include software objects that are used by a management plane to manage operation of the switch fabric 40. These software objects can be managed in circuitry, processors, etc. disposed with the switch fabric 40 or communicatively coupled thereto.

In the configuration of the switch fabric 40, source 12 and sink 14 components of the various CTP object models 10 can be available to use with different cross-connect objects. For example, the source 12A of the model 10A-1 connects to the sink 14E of the model 10E-2 for a DDE XCON (A->E) 44, and the sink 14A of the model 10A-2 connects to the source 12D of the model 10D-1. for a DDE XCON (D->A) 46 The source 12B of the model 10B-1 connects to the sink 14D of the model 10D-2 for a DDE XCON (B->D) 48, and the source 12E of the model 10E-1 connects to the sink 14C of the model 10C-2 for a DDE XCON (E->C) 50. Thus, the models 10A-1, 10A-2, 10B-1, 10B-2, 10C-1, 10C-2, 10D-1, 10D-2, 10E-1, 10E-2 have their associated sources 12 and sinks 14 decoupled from one another allowing true unidirectional cross connects through the switch fabric 40. Thus, FIG. 3 illustrates an exemplary embodiment whereby the systems and methods decouple the directions of the sources 12 and sinks 14 of each of the CTPs 10. The asymmetric traffic pattern systems and methods maximize the bandwidth usage of CTP objects 10 by decoupling the source and sink directions of the CTP. The direction decoupled CTP can be used to configure the input and output of the different cross-connect objects in the system.

Additionally, the asymmetric traffic pattern systems and methods can provide asymmetric traffic patterns by being able to program transmit and receive directions of any given timeslot/channel/tributary unit of the switch fabric 40 independently and separately with different concatenation information. For example, the DDE XCON (A->E) 44 can be a first size (e.g., STS-3c) while the DDE XCON (D->A) 46 is a second size (e.g., STS-12c). Also, transmit and receive directions of every timeslot/channel/tributary unit can have separate and independent tributary port numbers (TPN) in the CTP objects 10, different head timeslots, and the like. Fundamentally, while the sources 12 and sinks 14 are part of the same CTP object 10, these can have the same or different directions with the same or different sizes, etc. Also, the asymmetric traffic pattern systems and methods include a bandwidth manager associated with the CTPs 10, the switch fabric 40, etc. that is able to manage bandwidth separately for transmit and receive directions independently, but yet collocate and correlate two directions into one direction when signaled control plane connection requests are bidirectional and provide true asymmetric unidirectional bandwidth support for asymmetric unidirectional signaled control plane connections.

Figure 4:
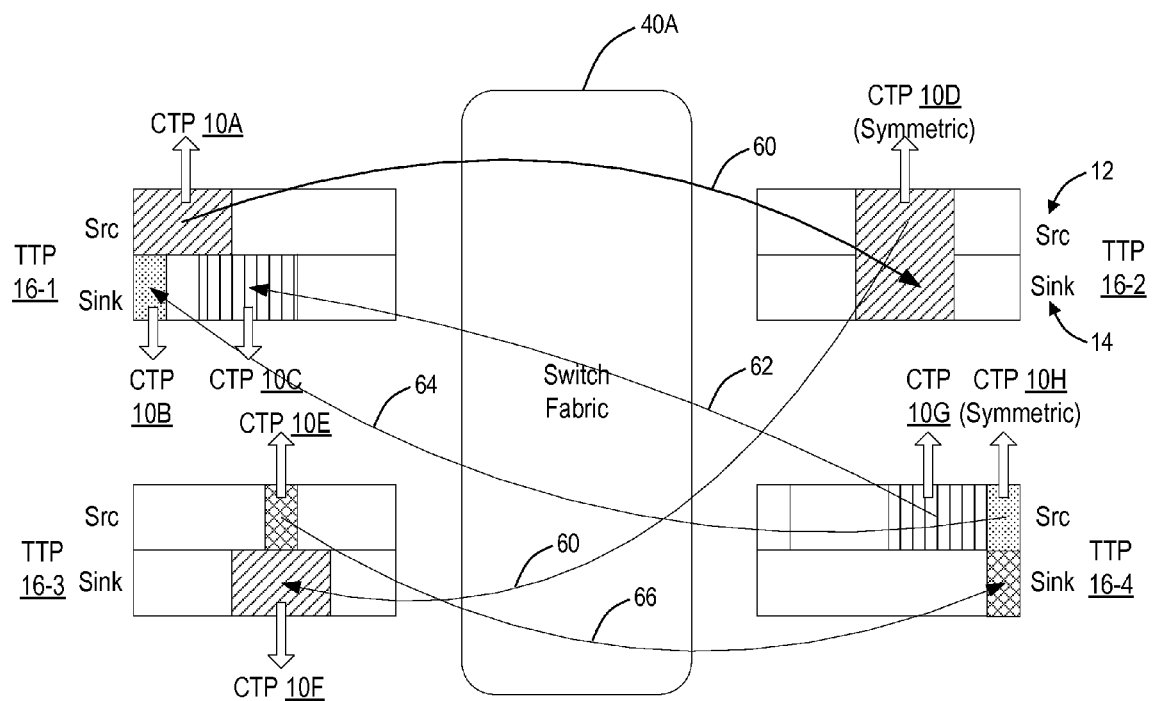

Referring to FIG. 4, in an exemplary embodiment, a block diagram illustrates a switch fabric 40A with exemplary asymmetric, directionally decoupled connections there through. The switch fabric 40A includes four TTPs 16-1, 16-2, 16-3, 16-4 with various CTP objects 10A-10H therein. By way of definition, a symmetric connection is one that may be split into two unidirectional connections of the same size such that, for each connection end point, the source and sink has same bandwidth. Conversely, an asymmetric connection is one that may be envisioned as two unidirectional connections of different sizes. In this case on a given Trail termination point, the source and sink will have different bandwidth. The switch fabric 40A illustrates various flexible cross connects (FCCs) 60, 62, 64, 66 to illustrate traffic patterns for the asymmetric traffic pattern systems and methods. In the switch fabric 40A, every timeslot/channel/tributary unit has a transmit and a receive direction making the CTP object 10 itself decoupled in the transmit and receive directions. Each of the CTP objects 10 can participate in one or two different cross connects of two different concatenations having two different head timeslot. Thus, the switch fabric 40A with the CTP objects 10 allows for asymmetric traffic patterns.

In this specific example of FIG. 4, CTP objects 10A, 10B, 10C, 10E, 10F, 10G are asymmetric end-points whereas CTP objects 10D, 10H are symmetric end-points. The CTP object 10D on the TTP 16-2 is symmetric in nature since the source and sink participate in connections of the same size, but the source 12 and the sink 14 are directionally decoupled since they belong to two separate connections. For example, a FCC 60 connects the source 12 of the CTP object 10D through the switch fabric 40A to the sink 14 of the CTP object 1OF on the TTP 16-3, and the FCC 60 connects the sink 14 of the CTP object 10D through the switch fabric 40A to the source 12 of a CTP 10A on the TTP 16-1. A FCC 62 connects the source 12 of the CTP 10G on the TTP 16-4 to the sink 14 of the CTP 10C on the TTP 16-1. A FCC 64 connects the source 12 of the CTP 10H on the TTP 16-4 to the sink 15 of the CTP 10B on the TTP 16-1. The CTP 10H is also symmetric and a FCC 66 connects the sink 14 of the CTP 10H to the source 12 of the CTP 10E on the TTP 16-3. From FIG. 4, it can be seen that the FCCs 60, 62, 64, 66 (used as simple unidirectional cross connects) can be used to create Asymmetric traffic pattern. Note, the FCC 62 and the FCC 66 overlap with the FCC 60, for example. Note, the CTP 10H supports both the FCCs 64, 66, and the CTP 10H could be split into two separate CTP objects.

Figure 5:
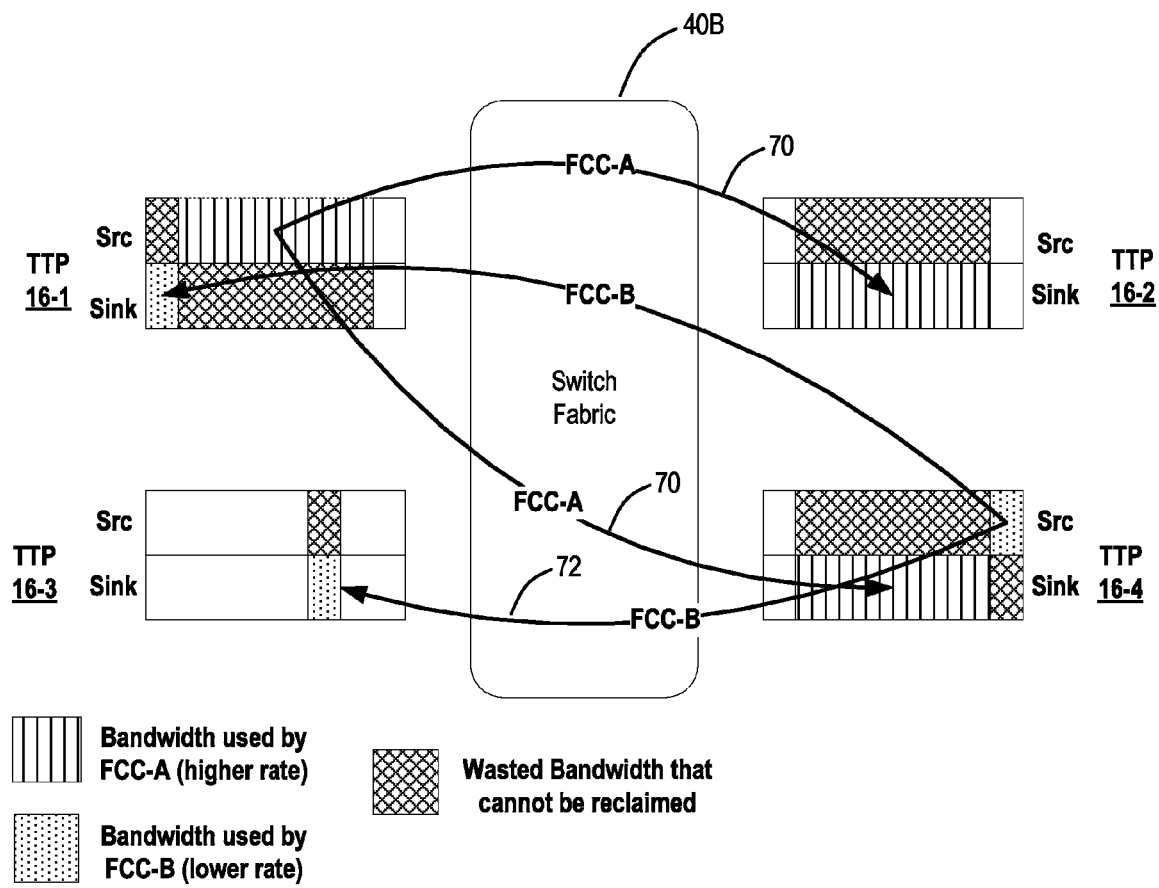
FIG. 5 is a blocking diagram illustrating the concept of usable bandwidth and fragmentation.
Figure 6:
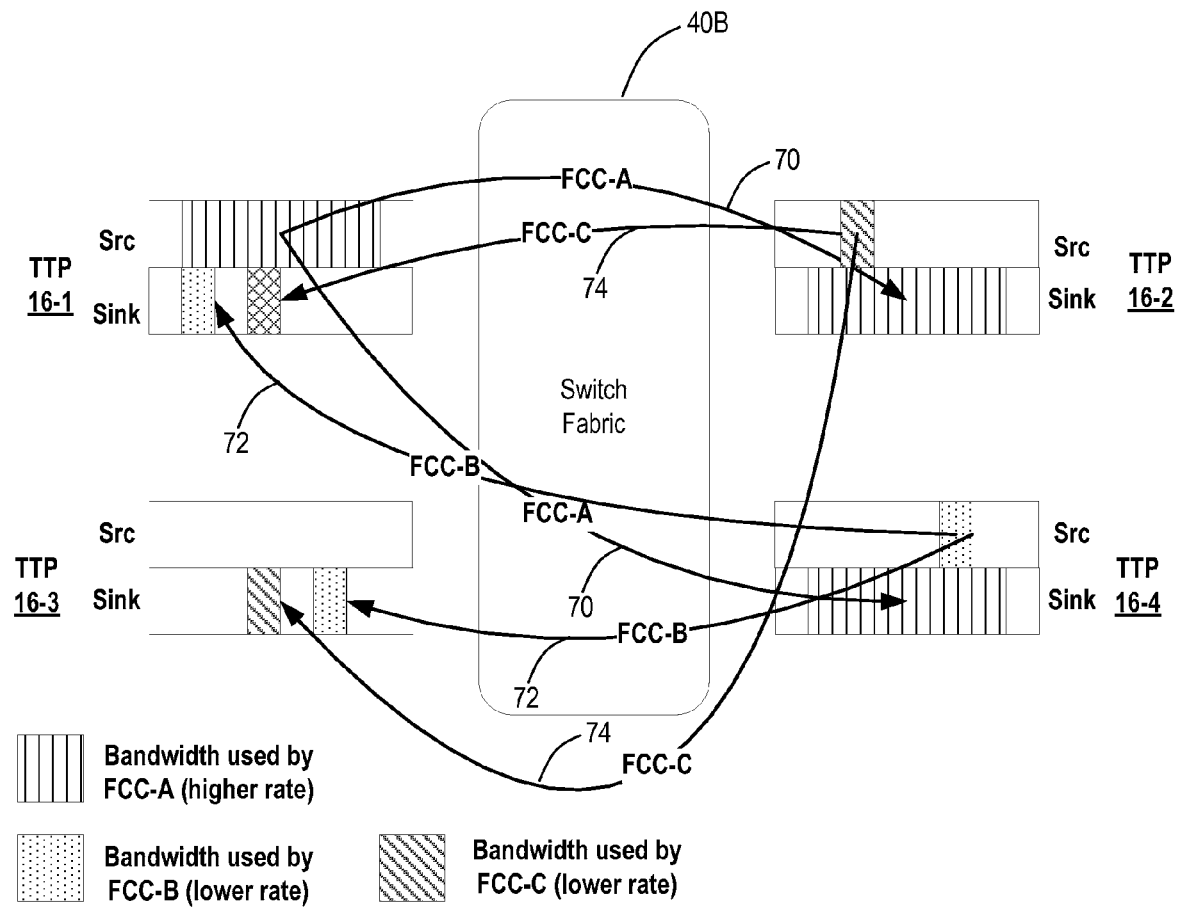
FIG. 6 is a block diagram illustrating use of asymmetric traffic patterns to solve the problems illustrated in FIG. 5 with usable bandwidth and fragmentation.

Referring to FIGS. 5 and 6, in an exemplary embodiment, block diagrams illustrate use of asymmetric traffic patterns through a switch fabric 40B. FIG. 5 illustrates the switch fabric 40B without asymmetric traffic patterns, and FIG. 6 illustrates the switch fabric 40B with asymmetric traffic patterns. The asymmetric traffic pattern systems and methods make it possible to avoid bandwidth fragmentation. That is, the systems and methods avoid the loss of bandwidth by collocating bandwidth in true transmit and receive directions and allowing overlap along with a true correlation between unidirectional bandwidth with that of bidirectional bandwidth. This has two advantages. First, there is more availability of "bi-directional" bandwidth since unidirectional traffic is collocated and the unidirectional traffic conserves bandwidth because the restriction of symmetric traffic patterns is removed. Second, relative to control plane implementations and point-and-click provisioning, the asymmetric traffic patterns allow signaled end-to-end circuits to be flexible enough to have either bidirectional traffic, unidirectional symmetric traffic, or unidirectional asymmetric traffic with point and click provisioning options without having to worry about bandwidth usage at every single node.

FIG. 5 illustrates the switch fabric 40B with directionally decoupled CTPs in TTPs 16-1, 16-2, 16-3, 16-4, but with symmetry requirements. That is, each source 12 has to have an equal amount of bandwidth in the corresponding sink 14 (as well as the same timeslots). FIG. 5 illustrates two FCCs 70, 72. For example, assume the FCC 70 is sourced from a source 12 in the TTP 16-1, and the FCC 70 is sent to the sinks 14 of the TTP 16-2 and TTP 16-4. The FCC 72 is sourced from a source 12 in the TTP 16-4 and sent to sinks 14 of the TTP 16-1 and TTP 16-3. The FCCs 70, 72 are each unidirectional connections. For illustration purposes, assume the FCC 70 includes STS-12c or STS-48c of bandwidth, and the FCC 72 includes STS-3c of bandwidth. Also, assume the FCC 70 is unidirectional, i.e. the TTP 16-1 only sources the FCC 70, but does not sink anything. This may be the situation with multicast traffic, e.g. video broadcasts. The new STS-3c FCC 72 cannot re-use the unidirectional bandwidth that is available from the first STS-12c/STS-48c FCC 70. These results in "unused" unidirectional bandwidth that may never be reclaimed leading to more bandwidth fragmentation. Because of this limitation, there is less "bi-directional" bandwidth (timeslots) available at the end for other applications to use. Note, this problem multiplex further when viewed in a network context with multiple network elements and unidirectional end-to-end signaled circuits causing fragmentation on each of the network elements.

FIG. 6 illustrates the switch fabric 40B with directionally decoupled CTPs in TTPs 16-1, 16-2, 16-3, 16-4, and it shows how the bandwidth issue is resolved with asymmetric traffic patterns. Note, FIG. 6 includes the same bandwidth connections as in FIG. 5 for the FCCs 70, 72 along with an additional FCC 74. Importantly, the Trail termination points (TTP) use bandwidth more efficiently than in FIG. 5 while having an additional FCC 74. In the example of FIG. 6, the FCC 70 (e.g., an STS-12c/STS-48c) is the same as in FIG. 5. However, the FCC 72 (e.g., an STS-3c) can now use an unused sink on the TTPs 16-1 as well as overlapping on the source on the TTP 16-4. In view of FIG. 6, the advantages are clear. First, the FCCs 70, 72, 74 have overlapping timeslots, different directions, and are part of different concatenated CTPs with different head timeslots. In FIG. 6, there is no bandwidth wasted. The unidirectional bandwidth that is not used in one FCC (e.g., the FCC 70), is readily available for use in other FCCs (e.g., the FCCs 72, 74) thereby conserving bandwidth for optimal utilization. In an exemplary embodiment, bandwidth fragmentation can be avoided by always allocating "available unidirectional" bandwidth. This would always preserve "bi-directional" bandwidth for other applications that are strictly "bi-directional" such as Bi-directional subnetwork connections (SNCs) from a control plane. Using this approach, SNCs (end-to-end signaled circuits) can also be truly asymmetric unidirectional and drop off to an FCC which is again truly asymmetric and unidirectional in nature. As is further described herein, any such connections can be merged into one new connection or split apart into their individualized connections when needed without affecting the blocking probability.

Figure 7:
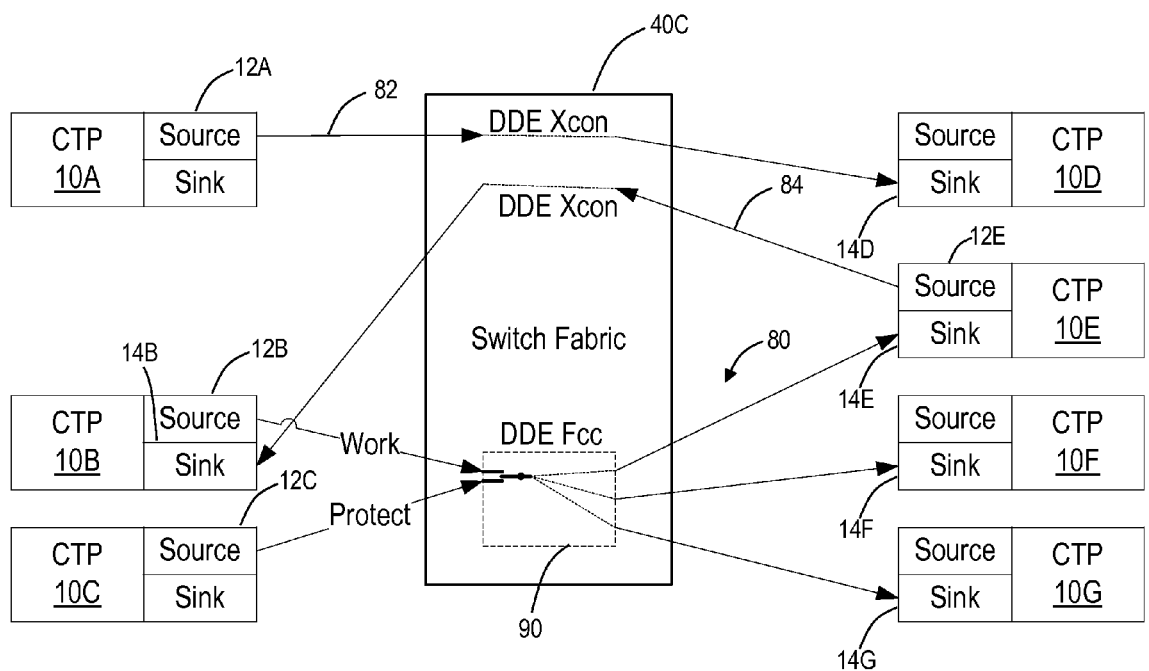
FIG. 7 is a block diagram of a switch fabric of a DDE Flexible Cross Connect (FCC) and DDE XCONs with decoupled source and sink endpoints of CTP objects.

Referring to FIG. 7, in an exemplary embodiment, a block diagram illustrates a switch fabric 40C illustrating a DDE FCC 80 and DDE XCONs 82, 84 with decoupled source 12 and sink 14 endpoints of CTP objects 10A-10G. The DDE XCON 82 includes the source 12A to the sink 14D, and the DDE XCON 84 includes the source 12E to the sink 14B. Additionally, there is a Virtual Connection Point (VCP) object 90 associated with the DDE FCC 80. The VCP object 90 is described in commonly-assigned U.S. patent application Ser. No. 11/331,335 filed Jan. 12, 2006 and entitled "METHODS AND SYSTEMS FOR MANAGING DIGITAL CROSS-CONNECT MATRICES USING VIRTUAL CONNECTION POINTS," the contents of which are incorporated by reference herein. Similar to the CTP object 10, the VCP object 90 is a logical object maintained in software for managing resources of the switch fabric 40C. In particular, the VCP object 90 is meant to be an intermediate point between two CTP objects 10 acting as a source, sink, or both. Conceptually, the CTP objects 10 can be viewed as sources 12 and/or sinks 14 for ingress and/or egress of connections from the switch fabric 40C whereas the VCP object 90 can be viewed as a source, sink, or both within the switch fabric 40C.

In the example of FIG. 7, the DDE FCC 80 is sourced from a source 12B of the CTP 10B and from a source 12C of the CTP 10C to the VCP 90. That is, the source 12B can be referred to as a working port of the DDE FCC 80 and the source 12C can be referred to as a protection port of the DDR FCC 80, or vice versa. The VCP 90 is configured to receive the dual inputs from the sources 12B, 12C and send one to the sinks 14E, 14F, 14G of the CTPs 10E, 10F, 10G, respectively. Also note, the source 12E participates in the DDE XCON 84 whereas the sink 14E participates in the DDE FCC 80. The VCP 90 in this example functions both as a point of input selection and a broadcasting point. Note, this functionality of the point of input selection and the broadcasting point could be used together or separately. Further, the VCP 90 can be used to merge and/or split graphs associated with the CTP objects 10. That is, VCPs including the VCP 90 can be shared between the cross connects and FCCs, i.e. the DDE FCC 80, the DDE XCONs 82, 84, etc. Use of the VCPs in the switch fabric 40C enable an intermediate point between the CTP objects 10 that can be used for a plurality of functions including merging and/or splitting connections. In an exemplary embodiment, the VCP 90 (or other VCPs) could be used to provide transparent conversion methods to convert symmetric traffic patterns to asymmetric traffic patterns and vice-versa, without hitting traffic.

In an exemplary embodiment, the switch fabric 40 can switch data units, tributaries, timeslots, channels, etc. related to SONET, SDH, and/or OTN. In particular, the protocol (i.e., SONET, SDH, OTN, etc.) determines the bandwidth sizes and granularity for the CTP objects 10, the DDE XCONs, the DDE FCCs, etc. For example, the following table illustrates exemplary protocols, supported types/sizes of bandwidth, and lowest granularity of bandwidth:

| Protocol | Supported Types/Sizes | Lowest Granularity |
| --- | --- | --- |
| SONET | STS-1c, STS-3c, STS-12c, STS-48c, STS-192c, Arbitrary concatenation sizes | STS-1c |
| SDH | AU-3, AU-4, AU-4-4c, AU-4-16c, AU-4-64c, Arbitrary concatenation sizes | AU-3 |
| OTN (with payload = –x20) | ODU1, ODU2 | ODU1 ODU0 (under ODU1 TTP) |
| OTN (with payload = 0x21) | ODU3, ODU2, ODU1 | ODU0 |

Figure 8:
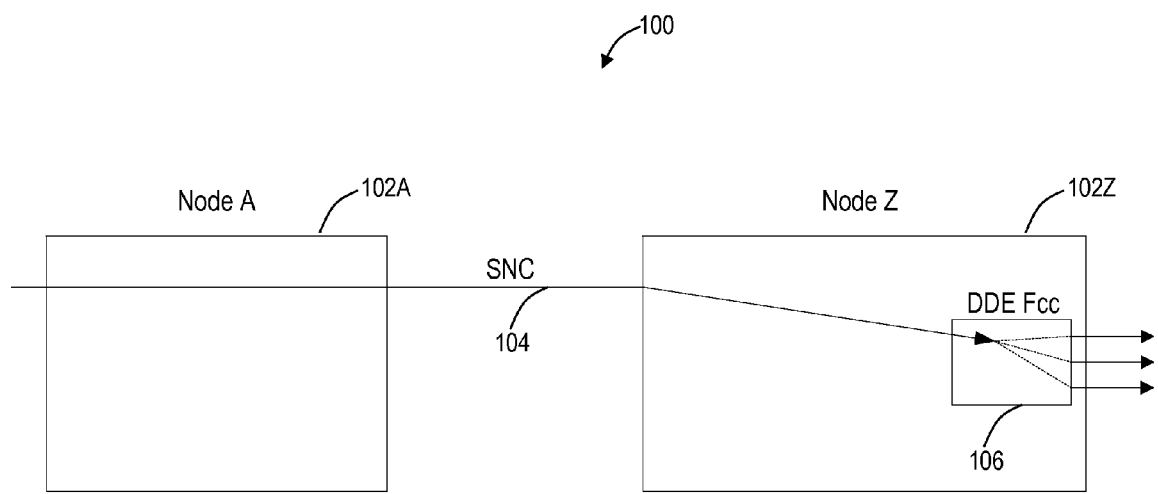
FIG. 8 is a block diagram of a network of two nodes with switch fabrics utilizing asymmetric traffic patterns.

Referring to FIG. 8, in an exemplary embodiment, a block diagram illustrates a network 100 of two nodes 102A, 102Z with switch fabrics utilizing asymmetric traffic patterns. The DDE XCONs and DDE FCCs described herein with respect to individual switch fabrics, such as the switch fabric 40, can be extended for use with signaled connections via a control plane. In an exemplary embodiment, the control plane can be Automatically Switched Optical Network (ASON) as defined in G.8080/Y.1304, Architecture for the automatically switched optical network (ASON) (February 2005), the contents of which are herein incorporated by reference, and the like. In another exemplary embodiment, the control plane can be Generalized Multi-Protocol Label Switching (GMPLS)

Architecture as defined in Request for Comments: 3945 (October 2004), the contents of which are herein incorporated by reference, and the like. In yet another exemplary embodiment, the control plane can be Optical Signaling and Routing Protocol (OSRP) from Ciena Corporation of Linthicum, MD which is an optical routing protocol similar to PNNI (Private Network-to-Network Interface) and MPLS (Multiprotocol Label Switching). Those of ordinary skill in the art will recognize the network and the control plane may utilize any type control plane for controlling the network elements and establishing connections therebetween.

In the example of FIG. 8, a control plane controls establishment of a subnetwork connection (SNC) 104 between the two nodes 102A, 102Z. The SNC 104 is originated at the node 102A, such as through CTP objects 10 in a switch fabric 40, and terminated at the node 102Z with the SNC 104 dropping data to a DDE FCC VCP object 106. The VCP object 106 can be associated with a switch fabric 40 at the node 102Z. With the systems and methods described herein, truly asymmetric unidirectional, end-to-end signaled circuits via a control plane are possible. Specifically, prior to the asymmetric traffic patterns described herein, end-to-end signaled circuits were always bidirectional. With the asymmetric traffic patterns, end-to-end signaled circuits can be established using the CTP objects 10 described herein in a unidirectional, asymmetric fashion. Thus, a end-to-end signaled circuit can be formed at a plurality of network elements with unidirectional asymmetric connections established in switch fabrics of each of the plurality of network elements.

The DDE FCCs and the DDE XCONs represent new cross connect architectures supporting unidirectional (i.e., directionally decoupled endpoints) and asymmetric traffic patterns. These new cross connects remove the limitations associated with conventional FCCs and XCONs, i.e. symmetric bandwidth reservation in both directions, offering flexibility to network operators and end users. Further, the DDE FCCs and the DDE XCONs can be downward or backward compatible with conventional FCCs and XCONs. That is, the switch fabric 40 can support a mixture of conventional FCCs and XCONs and the DDE FCCs and the DDE XCONs as requirements dictate. It is also contemplated that existing conventional FCCs and XCONs can be upgraded in-service to the DDE FCCs and the DDE XCONs without traffic hits, without changes to the old cross connect or any existing managed objects associated therewith, and with the old cross connect simply inheriting the new/enhanced features, i.e., asymmetry and de-coupling.

Figure 9:
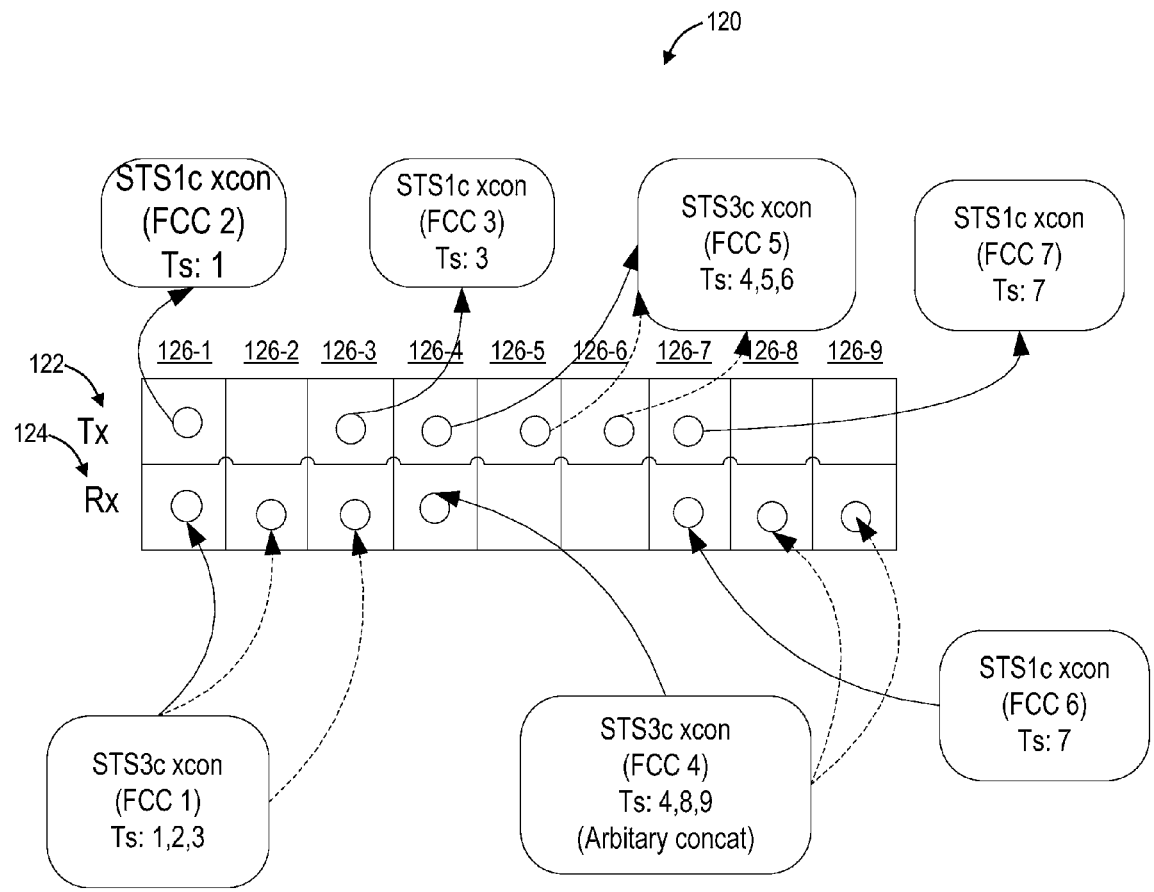
FIG. 9 is a block diagram of a Trail Termination Point (TTP) showing exemplary timeslot usage in SONET using asymmetric traffic patterns.

Referring to FIG. 9, in an exemplary embodiment, a block diagram illustrates a TTP 120 showing exemplary timeslot usage in SONET using asymmetric traffic patterns. The TTP 120 shows timeslot connections on transmit (Tx) 122 and receive (Rx) 124 with asymmetric traffic patterns. By way of definition, the Rx 124 is used to indicate from a facility, and the Tx 122 is used to indicate to a facility. Each block in the TTP 120 represents a timeslot 126 (denoted as 126-1-126-9 in FIG. 9). As described herein, the new and enhanced FCC is based on the introduction of the concept of Asymmetric Traffic pattern. On the TTP 120, timeslot map used in a connection for the Source or Rx 124 direction, may be different from the timeslot map used in Sink or Tx 122 direction. The TTP 120 includes various FCCs (FCC 1-FCC 7). With respect to timeslots 126-1, 126-2, 126-3, on the Tx 122, the timeslot 126-1 participates in the FCC 2 (STS-1c) and the timeslot 126-3 participates in the FCC 3 (STS-1c). On the Rx 124, the timeslots 126-1, 126-2, 126-3 participate in the FCC 1 (STS-3c). For the FCC 1, the timeslot 126-1 is the head timeslot, and the timeslots 126-2, 126-3 also participate. For the timeslots 126-4, 126-5, 126-6, on the Tx 122, the timeslots 126-4, 126-5, 126-6 participate in the FCC 5 (STS-3c), and on the Rx 124, the timeslot 126-4 participates with the timeslots 126-8, 126-9 in the FCC 4 (arbitrary concatenation). Finally, the FCC 7 uses the timeslot 126-7 on the Tx 122 (STS-1c), and the FCC 6 uses the timeslot 126-7 on the Rx 124 (STS-1c). Thus, as illustrated, the timeslots in Rx/Tx are used in an asymmetric fashion; they can be assigned in any way completely independent in Tx and Rx directions.

Figure 10:
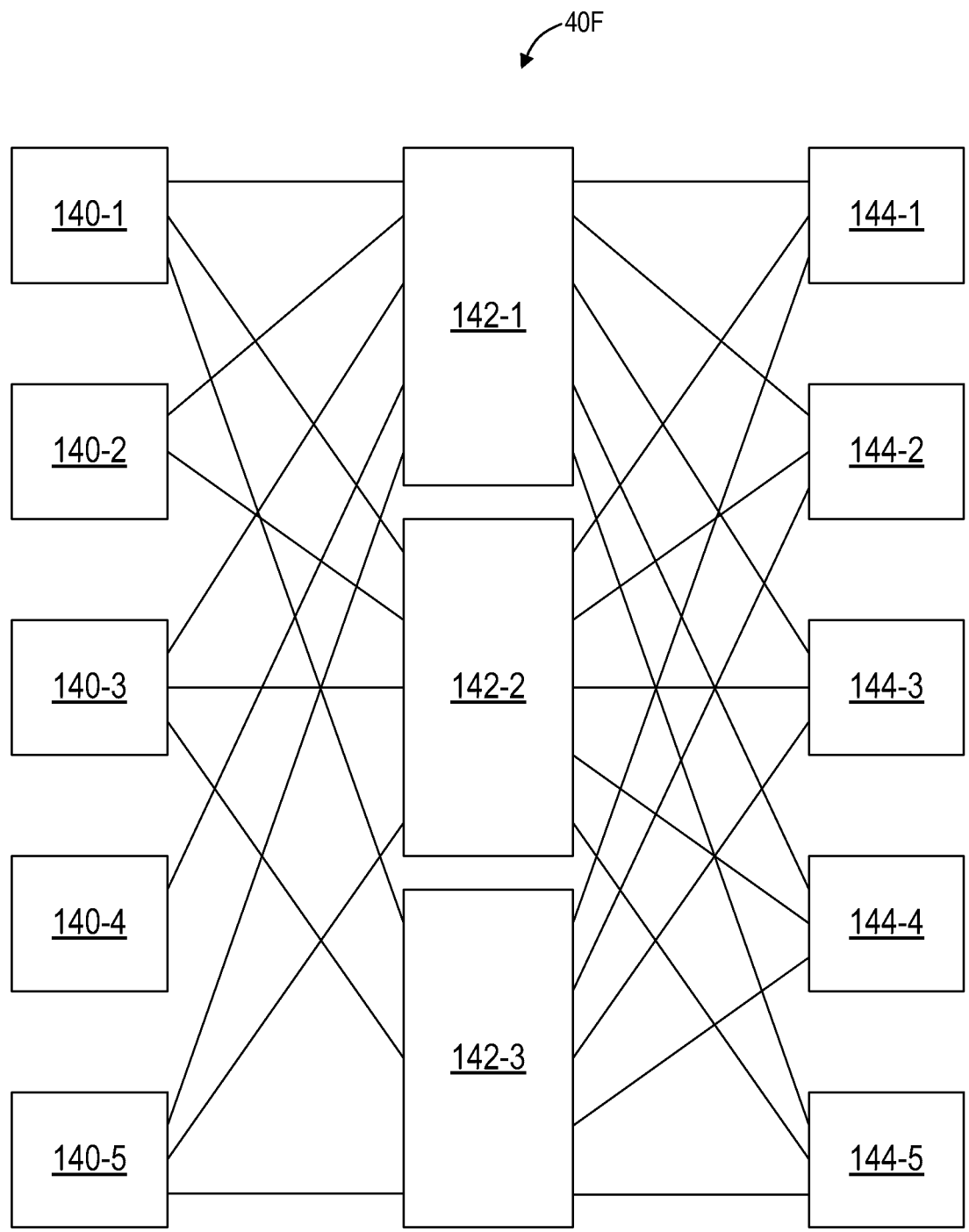
FIG. 10 is a block diagram of an exemplary switch fabric.

Referring to FIG. 10, in an exemplary embodiment, a block diagram illustrates an exemplary switch fabric 40F. The switch fabric 40F is a three-stage switching fabric 90 with first stage switches 140 (denoted as 140-1-140-5), center-stage switches 142 (denotes as 142-1-142-3), and third-stage switches 144 (denoted as 144-1-144-4). The switch fabric 40F can be a three-stage Clos switch, and those of ordinary skill in the art will recognize the switch fabric 40F can include any number of switches 140, 142, 144 as bandwidth requirements dictate. Of note, the switch fabric 40F can be fully non-blocking based on the selection of the number of switches 140, 142, 144. The switches 140, 142, 144 can be realized in electrical circuitry such as through application-specific integrated circuits (ASICs), field programmable gate arrays (FPGAs), and the like. Further, while the switch fabric 40F is illustrated as a three-stage switch, those of ordinary skill in the art will recognize any physical implementation of the switch fabric 40F is contemplated.

The relationship between the switch fabric 40, 40A, 40B, 40C, 40F (collectively referred to as the switch fabric 40) and the objects 10, 90 is a management relationship. The switch fabric 40 includes physical hardware, software, firmware, etc. that actually provides time division multiplexing (TDM) connections there through and switching of timeslots, channels, tributary units, etc. The objects 10, 90 are logical objects maintained in software, and the objects 10, 90 correspond to actual resources in the switch fabric 40. That is, the objects 10, 90 are part of a management plane associated with the switch fabric 40. Operations between the objects 10, 90 correspond actual physical operations in the switch fabric 40. That is, the switch fabric 40 is configured to set up actual connections based on states of the objects 10, 90. Assume a pair of CTP objects 10 and connecting a source 12 of one to a sink 14 of another, the switch fabric 40 is configured to perform the same operations for actual connections therein. Put differently, the objects 10, 90 are used to manage actual physical connections in the switch fabric 40. For example, CTP object 10 can correlate to the switches 140, 144 whereas VCP objects 90 can correlate to the switches 142. Those of ordinary skill in the art will recognize that the objects 10, 90 can be used to set up asymmetric traffic patterns through the switch 40.

Figure 11:
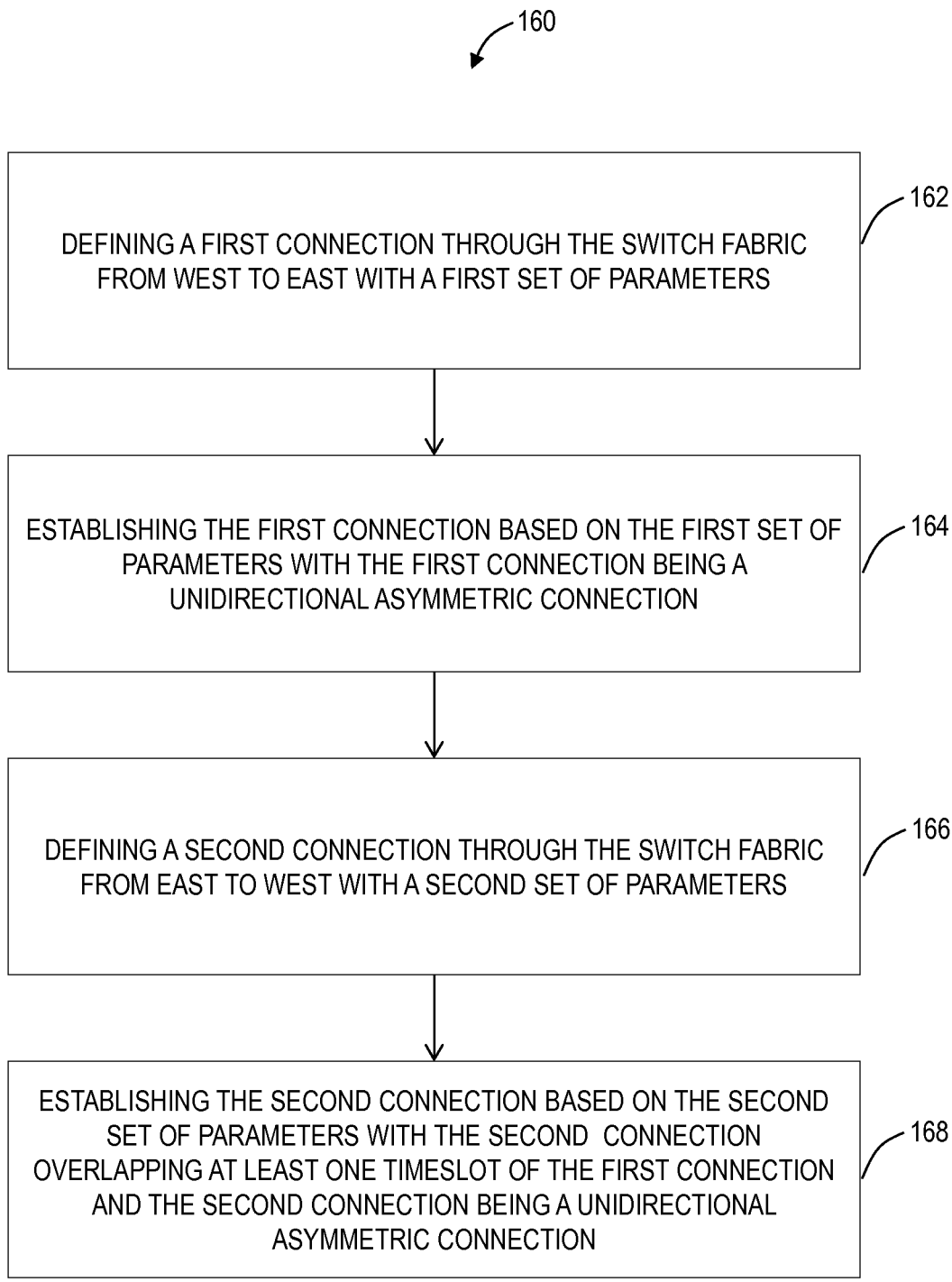
FIG. 11 is a flowchart of an asymmetric traffic pattern method using a switch fabric.

Referring to FIG. 11, in an exemplary embodiment, a flowchart illustrates an asymmetric traffic pattern method 160 using the switch fabric 40. The method 160 can make use of the CTP object model 10. First, a first connection is defined through the switch fabric 40 from West to East with a first set of parameters (step 162). In FIG. 10, directionally, the first connection is from the switch 140 to the switch 144 through the switch 142, i.e. West to East. The first set of parameters include inter alia a head timeslot, an overall amount of bandwidth, a concatenation type, etc. The first connection is established in the switch fabric 40 based on the first set of parameters with the first connection being a unidirectional asymmetric connection (step 164). Note, this can be a two-step or one-step process. Since the CTP object model 10 is a management plane, the two-step process can include defining the CTP 10, TTP, etc. in the management plane, and then physically establishing the actual connections in a data plane of the switch fabric 40. Next, a second connection is defined through the switch fabric 40 from East to West with a second set of parameters (step 166). In FIG. 10, directionally, the second connection is from the switch 144 to the switch 140 through the switch 142, i.e. East to West. The second set of parameters include inter alia a head timeslot, an overall amount of bandwidth, a concatenation type, etc., i.e. the second set of parameters can be the same type of data as the first set of parameters with different values. The second connection is established in the switch fabric 40 based on the second set of parameters with the second connection being a unidirectional asymmetric connection and with the second connection overlapping at least one timeslot with the first connection (step 168). By way of illustration, the first connection and the second connection can be different sizes (e.g., STS-1c vs. STS-3c) with at least one overlapping timeslot, such as illustrated in FIG. 9.

With respect to directionality of the switch fabric 40, one of ordinary skill in the art will recognize that data flows are bidirectional. For example and with reference to the switch fabric 40F in FIG. 10, the first stage switches 140 are both sending data to and receiving data from the center stage switches 142. Conversely, the third-stage switches 144 are both sending data to and receiving data from the center stage switches 142. For reference, data flowing from the switch fabrics 140 to the switch fabrics 144 can be said to be flowing East to West (or Left to Right), and data flowing from the switch fabrics 144 to the switch fabric 140 can be said to be flowing West to East (or Right to Left). In a similar manner, directionality of the switch fabric 40 can be referred to as Tx and Rx (or egress and ingress). That is, the switch fabric 40 can be conceptualized as a black box and the referenced data can be seen as being transmitted to or received from the switch fabric 40. With respect to timeslots of the switch fabric 40, assume the switch fabric supports 1 to N timeslots, N being an integer. Those of ordinary skill in the art will recognize that due to the bidirectional nature of the switch fabric 40, the 1 to N timeslots flow in the East to West direction and in the West to East direction. With the systems and methods described herein, the unidirectional asymmetric traffic patterns fundamentally enable overlapping of timeslots of different connections between the separate directions. Even further, the different connections can include different bandwidth sizes, concatenation types, head timeslots, etc.

With the asymmetric traffic patterns described herein, there can be requirements to switch connections from being symmetric to asymmetric (and vice versa, as well as switching from bidirectional to unidirectional, etc.). With conventional merging and splitting algorithms, it is not possible to guarantee a merged connection will traverse the same center stage switch 142. That is, upon merging two connections, the connections may still traverse different center stage switches thereby wasting bandwidth in the switch fabric 40. Thus, the systems and methods include a conversion from symmetric to asymmetric and vice-versa enabling flexibility for network operators to mix and match, plug-and-play their customer's traffic patterns without wasting bandwidth, without increasing blocking probability, and without hitting traffic.

Figure 12:
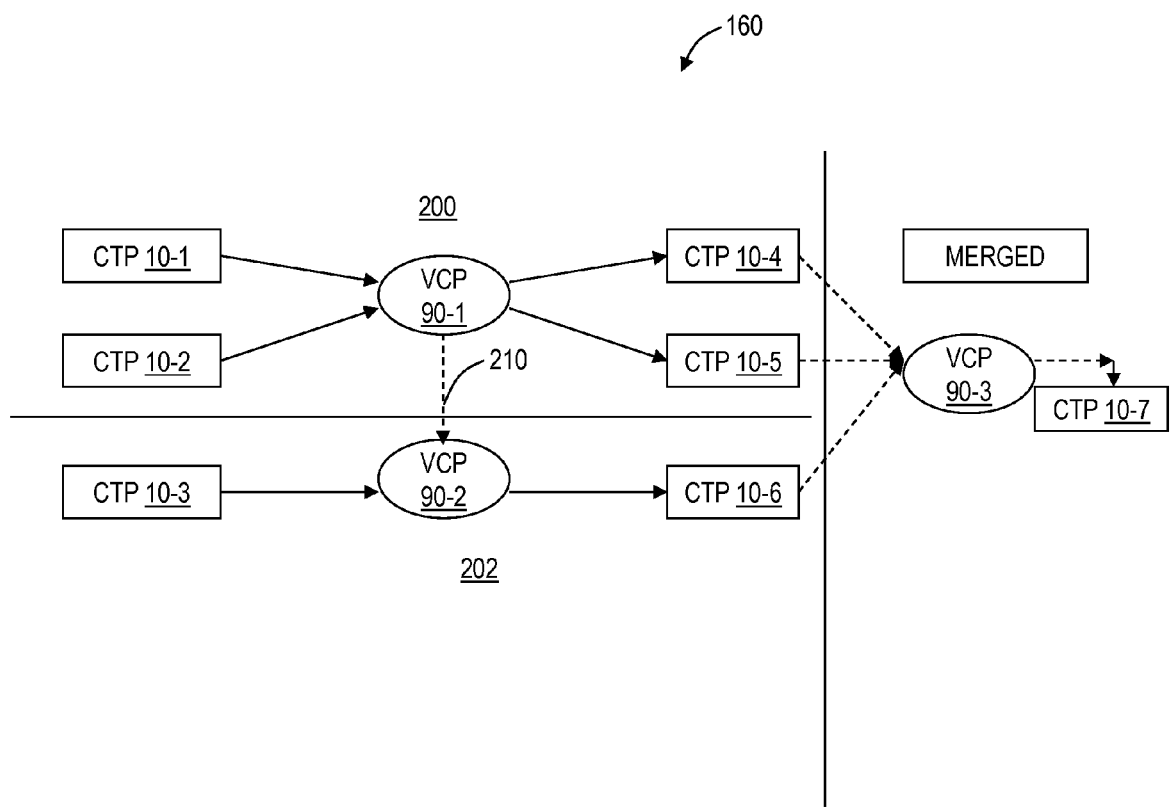
FIG. 12 is a block diagram of CTP and Virtual Connection Point (VCP) objects showing a merge and split of connections based thereon.

Referring to FIG. 12, in an exemplary embodiment, a block diagram illustrates objects 10, 90 showing a merge and split of connections based thereon. In the example of FIG. 12, there are two entities 200, 202, e.g. companies, with the entity 200 having a first connection defined by CTP objects 10-1, 10-2, 10-4, 10-5 and VCP object 90-1 and a second connection defined by CTP objects 10-3, 10-6 and VCP object 90-2. Variously, the systems and methods allow many different connections to be merged into one together without hitting traffic as well as splitting apart. For example, merger and/or split can be responsive to entities (e.g., companies) associated with connections being merged and/or split. Specifically, the systems and methods provide a merge and/or split of graphs with VCP object 90 merging and splitting. Each of these circuits can be signaled end-to-end circuits (e.g., SNCs) or simple cross connects within the same node. When either the merge or the split occurs, there is no blocking probability unlike old methods.

In the example of FIG. 12, assume the two entities 200, 202 merge, and it is desired to merge the first and second connections. The VCP objects 90-1, 90-2 provide an opportunity to merge these connections in the management plane without readjusting the actual connections in the data plane (which could result in blocking and/or a traffic hit). As described herein, similar to the CTP object 10, the VCP object 90 is a logical object maintained in software for managing resources of an underlying switch fabric 40. In particular, the VCP object 90 is meant to be an intermediate point between two CTP objects 10 acting as a source, sink, or both. Conceptually, the CTP objects 10 can be viewed as sources 12 and/or sinks 14 for ingress and/or egress of connections from the switch fabric 40 whereas the VCP object 90 can be viewed as a source, sink, or both within the switch fabric 40. In particular, between the CTP objects 10, the VCP objects 90 can have multiple inputs and multiple outputs. That is, the VCP objects 90 can be part of one or more cross connects and they can be merged and split at will. When VCPs are merged, they ensure use of a single center stage switch. In an exemplary embodiment, the first and second connections can be merged, in the management plane, by having an output 210 of the VCP object 90-1 to an input of the VCP object 90-2. In another exemplary embodiment, a new VCP object 90-3 can be formed with outputs from the CTP objects 10-4, 10-5, 10-6 provides to the VCP object 90-3 which provides a merged output to another CTP object 10-7.

In the management plane with the objects 10, 90, all of these can become a new cross connect with a new name or one of the old names keeping together the history of how each cross connects were before they got merged. Once the objects 10, 90 are redefined in a merged context, the connection through the switch fabric 40 can be rebuilt such that the traffic going over a single channel from CTP objects 10-1, 10-2, 103 to CTP objects 10-4, 10-5, 10-6 all go over a single center stage switch 142 making sure that there is no blocking probability. Conversely, if the entities 200, 202 are split off, the objects 10, 90 can be configured back to their previous state without hitting any traffic. This in-service merge and split is enabled by allowing the VCP objects 90 to be part of the cross connects and keeping track in the management plane of the previous state of the cross connects.

Note, the VCP 90 as a unidirectional VCP usually participates in a single connection, such as described in U.S. patent application Ser. No. 11/331,335. The systems and methods enable the VCP 90 to participate in multiple connections thereby allowing them to merge together into one single Super Connection. Note, the previous state of the connections are kept intact so that if any one of them comes and goes due to mesh restoration activities, the previous state of the existing connection and the new state of the mesh restored connection can be used to rebuild the super connection such that they both go through a single center stage for a single timeslot/channel from begin to end of the flow of traffic for one single timeslot, so that there is no blocking probability.

Figure 13:
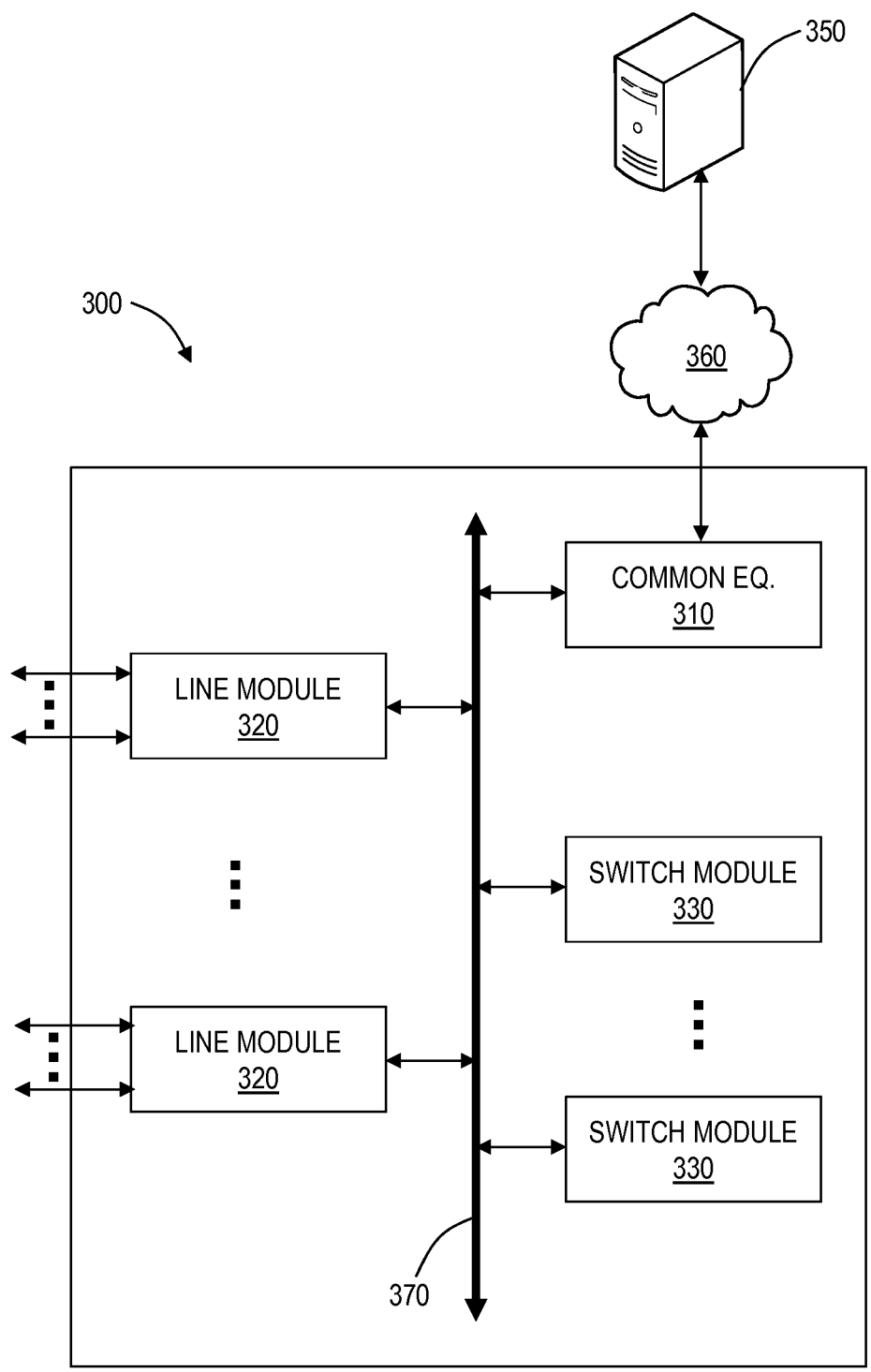
FIG. 13 is a block diagram of an exemplary network element for the unidirectional asymmetric traffic pattern systems and methods.

Referring to FIG. 13, in an exemplary embodiment, a block diagram illustrates an exemplary network element 300 for the unidirectional asymmetric traffic pattern systems and methods. In an exemplary embodiment, the network element 300 can be a nodal device that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing Layer 0, 1, and 2 consolidation. In another exemplary embodiment, the network element 300 can be any of an OTN add/drop multiplexer (ADM), a SONET/SDH ADM, a multi-service provisioning platform (MSPP), a digital cross-connect (DCS), an optical cross-connect, an optical switch, a router, a switch, a WDM terminal, an access/aggregation device, a private branch exchange (PBX), etc. That is, the network element 300 can be any digital system with ingress and egress digital signals and switching therebetween of channels, timeslots, tributary units, etc. While the network element 300 is generally shown as an optical network element, the unidirectional asymmetric traffic pattern systems and methods are contemplated for use with any switching fabric, network element, or network based thereon.

In an exemplary embodiment, the network element 300 includes common equipment 310, one or more line modules 320, and one or more switch modules 330. The common equipment 310 can include power; a control module; operations, administration, maintenance, and provisioning (OAM&P) access; and the like. The common equipment 310 can connect to a management system 350 through a data communication network 360. The management system 350 can include a network management system (NMS), element management system (EMS), or the like. Additionally, the common equipment 310 can include a control plane processor configured to operate a control plane as described herein. The network element 300 can include an interface 370 for communicatively coupling the common equipment 310, the line modules 320, and the switch modules 130 therebetween. For example, the interface 370 can be a backplane, mid-plane, a bus, optical or electrical connectors, or the like. The line modules 320 are configured to provide ingress and egress to the switch modules 330 and external to the network element 300. In an exemplary embodiment, the line modules 320 can form ingress and egress switches with the switch modules 330 as center stage switches for a three-stage switch, e.g. a three stage Clos switch. The line modules 320 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc.

Further, the line modules 320 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 320 can include wavelength division multiplexing interfaces, short reach interfaces, and the like, and can connect to other line modules 320 on remote network elements, end clients, edge routers, and the like. From a logical perspective, the line modules 320 provide ingress and egress ports to the network element 300, and each line module 320 can include one or more physical ports. The switch modules 330 are configured to switch channels, timeslots, tributary units, etc. between the line modules 320. For example, the switch modules 330 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), etc.; Ethernet granularity; Digital Signal n (DSn) granularity such as DS0, DS1, DS3, etc.; and the like. Specifically, the switch modules 330 can include both Time Division Multiplexed (TDM) (i.e., circuit switching) and packet switching engines. The switch modules 330 can include redundancy as well, such as 1:1, 1:N, etc.

Those of ordinary skill in the art will recognize the network element 300 can include other components which are omitted for illustration purposes, and that the systems and methods described herein are contemplated for use with a plurality of different network elements with the network element 300 presented as an exemplary type of network element. For example, in another exemplary embodiment, the network element 300 may not include the switch modules 330, but rather have the corresponding functionality in the line modules 320 (or some equivalent) in a distributed fashion. For the network element 300, other architectures providing ingress, egress, and switching therebetween are also contemplated for the systems and methods described herein. In general, the systems and methods described herein contemplate use with any network element providing switching of channels, timeslots, tributary units, etc. In various exemplary embodiments, the network element 300 is configured to support the systems and methods described herein through configuration of the modules 310, 320, 330.

Figure 14:
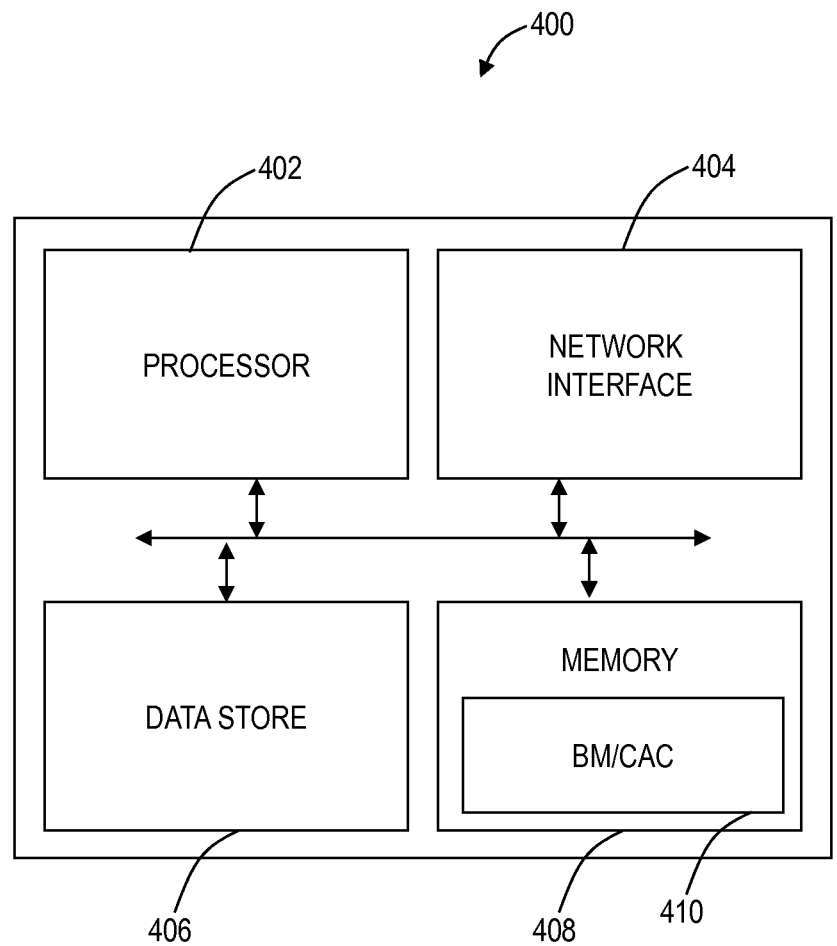
FIG. 14 is a block diagram of a control module to provide control plane processing and/or operations, administration, maintenance, and provisioning (OAM&P) for a node such as the network element of FIG. 13.

Referring to FIG. 14, in an exemplary embodiment, a block diagram illustrates a control module 400 to provide control plane processing and/or operations, administration, maintenance, and provisioning (OAM&P) for a node such as the network element 300. The control module 400 can be part of common equipment, such as common equipment 310 in the network element 300. The control module 400 can include a processor 402 which is hardware device for executing software instructions such as operating the control plane. The processor 402 can be any custom made or commercially available processor, a central processing unit (CPU), an auxiliary processor among several processors associated with the control module 400, a semiconductor-based microprocessor (in the form of a microchip or chip set), or generally any device for executing software instructions. When the control module 400 is in operation, the processor 402 is configured to execute software stored within memory, to communicate data to and from the memory, and to generally control operations of the control module 400 pursuant to the software instructions. In an exemplary embodiment, the asymmetric traffic pattern systems and methods contemplate use with the control module 400.

The control module 400 may also include a network interface 404, a data store 406, memory 408, and the like, all of which are communicatively coupled therebetween and with the processor 402. The network interface 404 may be used to enable the control module 400 to communicate on a network, such as to communicate control plane information to other control modules, to the management system 350, and the like. The network interface 404 may include, for example, an Ethernet card (e.g., 10 BaseT, Fast Ethernet, Gigabit Ethernet) or a wireless local area network (WLAN) card (e.g., 802.11a/b/g/n). The network interface 404 may include address, control, and/or data connections to enable appropriate communications on the network. The data store 406 may be used to store data, such as control plane information, provisioning data, management plane data, OAM&P data, etc. The data store 406 may include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 406 may incorporate electronic, magnetic, optical, and/or other types of storage media. The memory 408 may include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 408 may incorporate electronic, magnetic, optical, and/or other types of storage media. Note that the memory 408 may have a distributed architecture, where various components are situated remotely from one another, but may be accessed by the processor 402.

From a logical perspective, the control module 400 can include a bandwidth management function such as through a bandwidth manager (BM)/Call Admission Control (CAC) 410 to allocate bandwidth using the control plane. The control module 400 can be responsible for all control plane processing. Generally, a control plane includes software, processes, algorithms, etc. that control configurable features of a network, such as automating discovery of network elements, capacity on the links, port availability on the network elements, connectivity between ports; dissemination of topology and bandwidth information between the network elements; calculation and creation of paths for connections; network level protection and restoration; and the like. As described herein, the control plane can include ASON, GMPLS, OSRP, etc. The BM/CAC 410 is configured to allocate bandwidth using the systems and methods described herein.

In an exemplary embodiment, the BM/CAC 410 enables support for unidirectional, asymmetric connection requests via the control plane. When a request for bandwidth is unidirectional, the BM/CAC 410 allocates and reserves bandwidth for unidirectional purposes only but correlates this bandwidth from a bidirectional point of view. This means to allocate bandwidth in either the Tx or Rx directions (any one or both), the bidirectional bandwidth is considered occupied (i.e., reserved). Specifically, bidirectional bandwidth is reserved because the bandwidth is unavailable for handling bidirectional connections. However, the bandwidth is available for unidirectional connections in an opposite direction as the allocated bandwidth. If bidirectional bandwidth is occupied by a bidirectional application, it is not available for any unidirectional application, in any of the Tx or Rx directions. This way, unidirectional and bidirectional bandwidth is separated out but correlated from the control plane's perspective so that the mix and match of unidirectional and bidirectional traffic does not cause fragmentation (unlike old methods) and waste bandwidth. When a request for bandwidth is made by any other application, e.g. the control plane or user-created cross-connects (PVC), the BM/CAC 410 first looks at whether the bidirectional traffic is available (note that this is already correlated from that of unidirectional ones) and hence does not affect the mesh restoration timings of signaled circuits. In an exemplary embodiment, the BM/CAC 410 is modified to support the CTP objects 10, the VCP objects 90, etc. without changing operations associated with the TTP 16 and the PTP 18. That is, the TTP 16 and the PTP 18 can continue to operate bidirectionally.

Further, the control module 400 is configured to communicate to other control modules 400 in other nodes on the network. This communication may be either in-band or out-of-band. For SONET networks and similarly for SDH networks, the control module 400 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the present invention includes an in-band signaling mechanism utilizing OTN overhead. The General Communication Channels (GCC) defined by ITU-T G.709 are in-band side channels used to carry transmission management and signaling information within Optical Transport Network elements. The GCC channels include GCC0 and GCC1/2. GCC0 are two bytes within OTUk overhead that are terminated at every 3R (Re-shaping, Re-timing, Re-amplification) point. GCC1/2 are four bytes (i.e. each of GCC1 and GCC2 include two bytes) within ODUk overhead. In an exemplary embodiment, GCC0, GCC1, GCC2 or GCC1+2 may be used for in-band signaling or routing to carry control plane traffic. Based on the intermediate equipment's termination layer, different bytes may be used to carry control plane traffic. If the ODU layer has faults, it has been ensured not to disrupt the GCC1 and GCC2 overhead bytes and thus achieving the proper delivery control plane packets.

Figure 15:
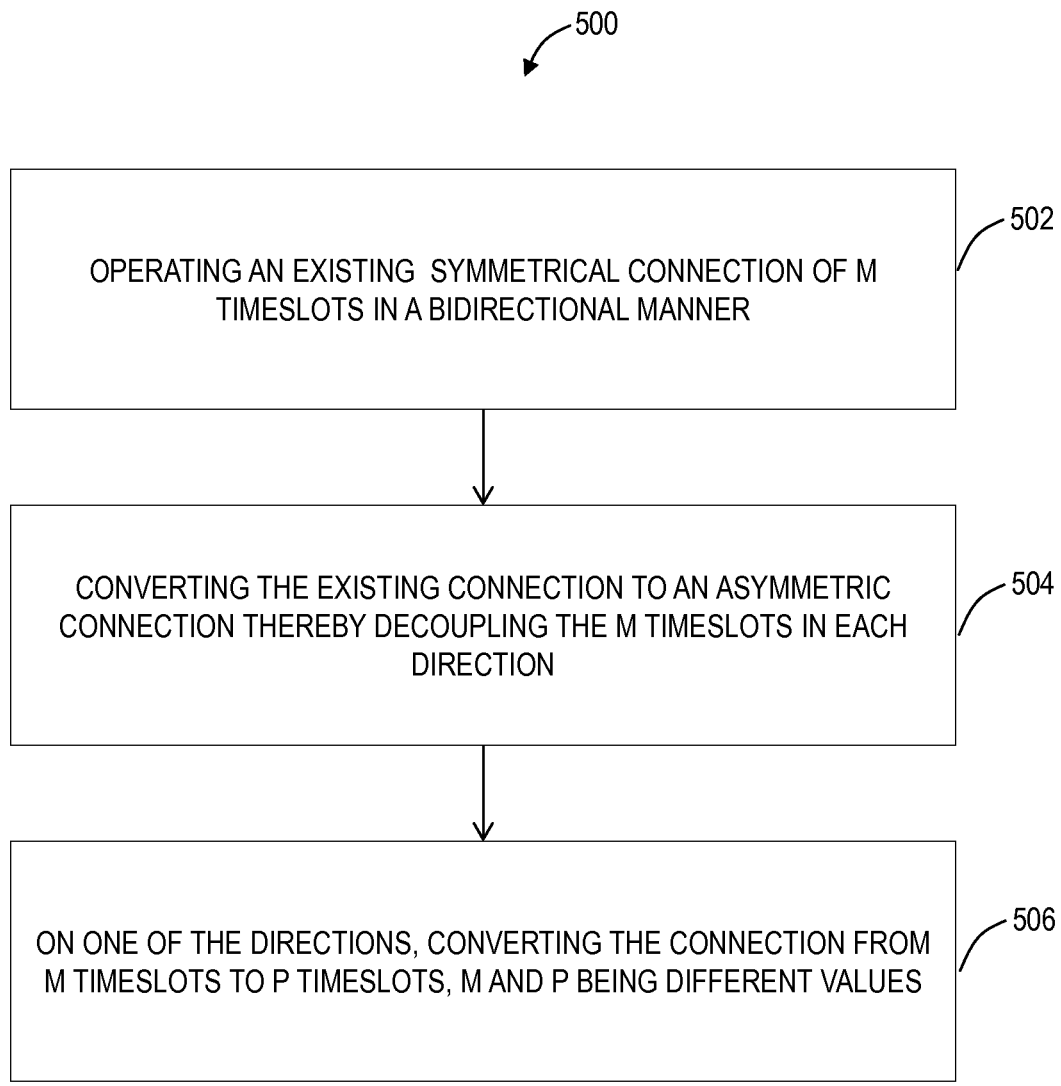
FIG. 15 is a flowchart of a cross connect conversion method.

Referring to FIG. 15, in an exemplary embodiment, a flowchart illustrates a cross connect conversion method 500. The conversion method 500 is an example of converting, in-service and without increasing blocking probability, cross connects from symmetric bidirectional connections to asymmetric unidirectional connections. First, assume an existing symmetrical connection of M timeslots is operating in a bidirectional manner (step 502). This is a standard cross connect through a switch fabric, and for sake of illustration, assume this existing symmetrical connection is bidirectional STS-3c traffic. To convert this existing symmetrical connection to an asymmetric unidirectional connection, first the existing symmetrical connection is decoupled to become asymmetric (step 504). That is, first the M timeslots are decoupled directionally, i.e. symmetric to asymmetric conversion. Now assume it is desired to change one direction of the M timeslots to a different amount of bandwidth, on that one direction, the connection is converted to P timeslots from M timeslots, M and P being different values (step 506). This changing of timeslots can be accomplished by changing the objects 10 and their associated endpoint timeslots. For example, assume this one direction is changed from STS-3c to STS-12c, this can be performed by adjusting an end timeslot in a CTP object 10 from a value, say M, to another value, say P. The method 500 can be adapted to convert asymmetric traffic to symmetric and make it bidirectional as well.

Thus, based on the foregoing systems and methods, every timeslot/channel/tributary unit in a switch fabric now has transmit and receive direction that can be programmed to be part of two different concatenation groups with two different head timeslots. Hence, the CTP objects 10 are decoupled in transmit and receive direction and can participate in one or two different cross connects of two different concatenations and having two different head timeslot and hence allowing for asymmetric traffic patterns to be possible. On each of these directions, two independent unidirectional CTPs can be used with different head timeslots as well as overlapping timeslots between the two and each CTP having a different concatenation. The systems and methods also allow different connections to be merged into one such as when two companies get merged together without hitting traffic and also to split to their original two connections if the two companies split apart, without incrementing the blocking probability. This is taken care by merge and split of graphs with VCP objects merging and splitting and mainly making sure of the fact that the ingress and egress flows of circuits from source to destination goes through a single center stage and thus making sure there is no blocking probability.

Advantageously, the systems and methods completely avoid bandwidth fragmentation and loss present in the current methods while setting up unidirectional traffic patterns of two different sizes in two different directions. The end result is having more bidirectional bandwidth available with the combination of symmetric, asymmetric and/or unidirectional or bidirectional traffic patterns. This allows signaled end-to-end circuits such as with control planes to be flexible enough to have either bidirectional bandwidth, unidirectional symmetric traffic, or unidirectional asymmetric traffic patterns with point and click provisioning options without having to worry about bandwidth usage at every single node.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

In addition to ITU-T M.3100, the systems and methods also relate to other standards. The TeleManagement Forum (TM Forum) has Multi-Technology Network Management (MTNM) specifications which are a Common Object Request Broker Architecture (CORBA)-based Network Management System-to-Element Management System interface suite. A standard from the TM Forum includes the TMF814 Multi-Technology Network Management (MTNM) Solution Set Release 3.5, the contents of which are incorporated by reference herein. The MTNM Solution Suite version 3.5 includes a set of documents which define the information exchange, or interface, between Network Management Systems (NMS) and Element Management Systems (EMS) enabling management of SONET/SDH, Dense Wave Division Multiplexing (DWDM), Asynchronous Transfer Mode (ATM), Connectionless (Ethernet), as well as Automatically Switched Optical Network (ASON) Control Plane based transport networks. Other standards can include G.805 (March 2000), "Generic functional architecture of transport networks," G.8080/Y.1304 (June 2006), Architecture for the automatically switched optical network (ASON), the contents of each are incorporated by reference herein.

Although the present disclosure has been illustrated and described herein with reference to preferred embodiments and specific examples thereof, it will be readily apparent to those of ordinary skill in the art that other embodiments and examples may perform similar functions and/or achieve like results. For example, various examples described herein reference FCCs—flexible cross connects as exemplary embodiments, and those of ordinary skill in the art will recognize that any other types of cross connects are also contemplated by the asymmetric traffic pattern systems and methods. All such equivalent embodiments and examples are within the spirit and scope of the present disclosure and are intended to be covered by the following claims.

What is claimed is:

1. A switch fabric system, comprising:
   a N×M switch fabric comprising M Trail Termination Points (TTPs) each comprising N timeslots there through in a bidirectional manner;
   a first connection in the switch fabric, wherein the first connection comprises a unidirectional asymmetric connection of X timeslots, wherein X<N; and
   a second connection in the switch fabric in an opposite direction as the first connection, wherein the second connection comprises a unidirectional asymmetric connection of Y timeslots, wherein Y<N, wherein at least one of the Y timeslots overlaps with one of the X timeslots on a same TTP of the M TTPs in the switch fabric, wherein Y does not equal X, and wherein N, M, X, and Y each comprises an integer;
   wherein the first connection and the second connection each comprise time division multiplexing connections.

2. The switch fabric system of claim 1, further comprising:
   a third connection in the switch fabric, wherein the third connection comprises a bidirectional symmetric connection of Z timeslots, wherein Z<N, wherein none of the Z timeslots overlap with the X timeslots or the Y timeslots on any of the TTPs, wherein Z comprises an integer.

3. The switch fabric system of claim 1, further comprising:
   a management plane associated with and for management of the switch fabric;
   wherein the management plane comprises a plurality of Connection Termination Point objects, and wherein each Connection Termination Point object comprises one of a source being sent to the switch fabric and a sink being received from the switch fabric.

4. The switch fabric system of claim 3, wherein, for a unidirectional asymmetric connection, the source and the sink of a Connection Termination Point object are directionally decoupled such that the source and the sink participate in two separate connections of different sizes.

5. The switch fabric system of claim 4, wherein, for the unidirectional asymmetric connection, from a perspective of the management plane, the source and the sink of the Connection Termination Point object are represented as separate source and sink CTP objects with different bandwidth amounts.

6. The switch fabric system of claim 3, wherein, in the management plane, the first connection is managed by a first Connection Termination Point object and a second Connection Termination Point object with the source of the first Connection Termination Point object connected to the sink of the second Connection Termination Point object; and
   wherein, in the management plane, the second connection is managed by a third Connection Termination Point object and a fourth Connection Termination Point object with the source of the third Connection Termination Point object connected to the fourth of the second Connection Termination Point object.

7. The switch fabric system of claim 6, wherein the first Connection Termination Point object and the third Connection Termination Point object are associated with a first Trail Termination Point, and wherein the second Connection Termination Point object and the fourth Connection Termination Point object are associated with a second Trail Termination Point.

8. The switch fabric system of claim 7, wherein the first Connection Termination Point object and the third Connection Termination Point object each comprise different head timeslots on the first Trail Termination Point.

9. The switch fabric system of claim 6, wherein the first Connection Termination Point object and the third Connection Termination Point object are associated with a first Trail Termination Point, wherein the second Connection Termination Point object is associated with a second Trail Termination Point, and wherein the fourth Connection Termination Point object is associated with a third Trail Termination Point.

10. The switch fabric system of claim 6, wherein each of the first Connection Termination Point object, the second Connection Termination Point object, the third Connection Termination Point object, and the fourth Connection Termination Point object are associated with separate Trail Termination Points.

11. The switch fabric system of claim 10, wherein each of the separate Trail Termination Points comprises a bidirectional connection supporting unidirectional asymmetric connections through the Connection Termination Point objects.

12. The switch fabric system of claim 6, wherein the management plane further comprises:
a Virtual Connection Point between the first Connection Termination Point object and the second Connection Termination Point object, wherein the Virtual Connection Point comprises both a point of input selection and a broadcasting point.

13. The switch fabric system of claim 12, wherein the Virtual Connection Point is utilized to merge the first connection with another connection through connecting an output of the Virtual Connection Point to the another connection.

14. The switch fabric system of claim 1, wherein the first connection and the second connection each comprise different concatenations.

15. The switch fabric system of claim 2, wherein the switch fabric is configured to convert the third connection from the bidirectional symmetric connection of Z timeslots to a unidirectional asymmetric connection in-service.

16. A method, comprising:
defining a first connection through a switch fabric in a first direction, wherein the first connection comprises a unidirectional asymmetric connection with a first set of parameters;
establishing the first connection through the switch fabric with the first set of parameters;
defining a second connection through the switch fabric is a second direction opposite from the first direction, wherein the second connection comprises a unidirectional asymmetric connection with a second set of parameters, wherein the second connection overlaps at least part of the first connection in the switch fabric, wherein the first connection is a different size than the second connection, and wherein the first connection and the second connection each comprise time division multiplexing connections; and
establishing the second connection through the switch fabric with the second set of parameters.

17. The method of claim 16, further comprising:
operating a third connection through the switch fabric bidirectionally;
converting the third connection to a unidirectional connection by decoupling end points of the third connection from one another thereby converting the third connection into a fourth connection in the first direction and a fifth connection in the second direction; and
adjusting parameters of the fourth connection to thereby convert the fourth connection to a unidirectional asymmetric connection.

18. A network element, comprising:
a plurality of ports;
a N×M switch fabric comprising M Trail Termination Points (TTPs) each comprising N timeslots there through in a bidirectional manner, wherein the switch fabric is connected to the plurality of ports;
a first connection in the switch fabric and terminating on one of the plurality of ports, wherein the first connection comprises a unidirectional asymmetric connection of X timeslots, wherein X<N; and
a second connection in the switch fabric in an opposite direction as the first connection and terminating on one of the plurality of ports, wherein the second connection comprises a unidirectional asymmetric connection of Y timeslots, wherein Y<N, wherein at least one of the Y timeslots overlaps with one of the X timeslots on a same TTP of the M TTPs in the switch fabric, wherein Y does not equal X, and wherein N, M, X, and Y each comprises an integer;
wherein the first connection and the second connection each comprise time division multiplexing connections.

19. The network element of claim 18, further comprising:
a controller configured to operate a control plane for establishment of connections through the network element;
wherein the control plane is configured to concurrently manage bidirectional symmetric connections, unidirectional symmetric connections, and unidirectional asymmetric connections.

20. The network element of claim 19, wherein the control plane treats the first connection and the second connection as occupied bidirectional connections for new bidirectional connections and unoccupied unidirectional connections based on the X timeslots and the Y timeslots for new unidirectional connections.

* * * * *